US011562384B2

(12) United States Patent
Whiting et al.

(10) Patent No.: US 11,562,384 B2
(45) Date of Patent: Jan. 24, 2023

(54) DYNAMIC CHOICE REFERENCE LIST

(71) Applicant: Qualtrics, LLC, Provo, UT (US)

(72) Inventors: Jeffrey Whiting, Salem, UT (US); David Patty, Orem, UT (US); Cutler (C J) Campbell, Lehi, UT (US); P J Tatlow, Spanish Fork, UT (US); Caius Worthen, Sandy, UT (US); Gregory Burnham, Springville, UT (US)

(73) Assignee: Qualtrics, LLC, Provo, UT (US)

( * ) Notice: Subject to any disclaimer, the term of this patent is extended or adjusted under 35 U.S.C. 154(b) by 105 days.

(21) Appl. No.: 16/399,624

(22) Filed: Apr. 30, 2019

(65) Prior Publication Data

US 2020/0349593 A1 Nov. 5, 2020

(51) Int. Cl.
*G06Q 30/02* (2012.01)
*G06N 20/00* (2019.01)
*G06F 16/9032* (2019.01)
*G06F 40/35* (2020.01)

(52) U.S. Cl.
CPC ... *G06Q 30/0203* (2013.01); *G06F 16/90332* (2019.01); *G06F 40/35* (2020.01); *G06N 20/00* (2019.01)

(58) Field of Classification Search
CPC .......... G06Q 30/0203; G06F 16/90332; G06F 40/35; G06N 20/00
USPC ........................................................ 705/7.32
See application file for complete search history.

(56) References Cited

U.S. PATENT DOCUMENTS

| | | | | |
|---|---|---|---|---|
| 9,569,729 B1* | 2/2017 | Oehrle | ................. | G06Q 10/063 |
| 2009/0306967 A1* | 12/2009 | Nicolov | .................. | G06F 40/30 |
| | | | | 704/9 |
| 2014/0316856 A1* | 10/2014 | Williams | ............... | G06Q 30/02 |
| | | | | 705/7.32 |
| 2015/0142704 A1* | 5/2015 | London | .................. | G06N 5/022 |
| | | | | 706/11 |
| 2015/0339684 A1* | 11/2015 | Mani | ........................ | G09B 7/02 |
| | | | | 705/7.32 |

(Continued)

OTHER PUBLICATIONS

Artificial conversations for customer service chatter bots: Architecture, algorithms, and evaluation metrics C Chakrabarti, GF Luger—Expert Systems with Applications, 2015—Elsevier (Year: 2015).*

*Primary Examiner* — Charles Guiliano
(74) *Attorney, Agent, or Firm* — Keller Preece PLLC

(57) ABSTRACT

This disclosure covers methods, systems, and computer-readable media that select answer choices from potential answer choices for a digital question based on responses to other digital questions and/or embedded user data. In certain embodiments, the disclosed systems select answer choices from potential answer choices for a digital question based on a multiple choice response. Furthermore, in some embodiments, the disclosed systems select answer choices from potential answer choices for a digital question based on keywords and/or sentiment values identified by analyzing a text response. In some embodiments, the disclosed systems select answer choices for a digital question from a dynamic choice reference dataset that comprises potential answer choices. Additionally, in one or more embodiments, the disclosed systems train and/or utilize a machine-learning model to select answer choices from potential answer choices for a digital question based on a response.

18 Claims, 14 Drawing Sheets

(56) References Cited

U.S. PATENT DOCUMENTS

| | | | | |
|---|---|---|---|---|
| 2017/0372029 A1* | 12/2017 | Saliman | ............... | G16H 10/60 |
| 2018/0357220 A1* | 12/2018 | Galitsky | ............... | G06F 40/216 |
| 2019/0066136 A1* | 2/2019 | Kopikare | ............... | H04L 51/02 |
| 2019/0114321 A1* | 4/2019 | Lam | ............... | G06F 40/284 |
| 2019/0188645 A1* | 6/2019 | Monasor | ............... | G06Q 10/1053 |
| 2019/0370390 A1* | 12/2019 | Hammontree | ............... | G06Q 10/10 |

\* cited by examiner

Dynamic Choice Reference Dataset 416

| Potential Answer Choices 418 | Dynamic Choice Tag 420 | Country Codes 422 | Age 424 | Gender 426 | Languages 428 | Operating System 430 | Rank 432 |
|---|---|---|---|---|---|---|---|
| Pepperoni Pizza | 1 | ALL | ALL | ALL | English | ALL | 1 |
| Fish Taco | 2 | US | ALL | ALL | English | ALL | 34 |
| Breadsticks | 1 | ALL | ALL | ALL | English | ALL | 2 |
| Fries | 3 | ALL | ALL | ALL | English | ALL | 11 |
| Buffalo Wings | 1 ; 3 | US ; UK | ALL | ALL | English | ALL | 12 |
| Cheese Burger | 3 | ALL | ALL | ALL | English | ALL | 6 |
| Mushroom Pizza | 1 | US | ALL | ALL | English | ALL | 3 |
| Gelato | 1 ; 3 | IT ; UK | ALL | ALL | English ; Italian | iOS | 31 |
| Grissini | 1 | IT | ALL | ALL | Italian | ALL | 19 |
| {Text Answer Format} | 5 | ALL | ALL | ALL | English | ALL | 1 |

*Fig. 4B*

Dynamic Choice Reference Dataset 518

| Potential Answer Choices 520 | Keywords 522 | Sentiment Values 524 | Dynamic Choice Tag 526 | Gender 528 | Age 530 | Income 532 | Operating System 534 | Rank 536 |
|---|---|---|---|---|---|---|---|---|
| Cleanliness | Sanitary; Unsanitary;... | Very Bad;... | 1 | ALL | ALL | ALL | iOS; Android | 1 |
| Food | Concession; Nachos;... | Very Bad;... | 5 | ALL | ALL | ALL | iOS; Android | 4 |
| Restrooms | Toilet; Sinks; Hand Dryer;... | ALL | 1 | ALL | ALL | ALL | iOS; Android | 10 |
| Lighting | Dark; Bright;... | ALL | 2 | ALL | ALL | ALL | iOS; Android | 25 |
| Noise | Uncomfortable; Loud;... | ALL | 4 | ALL | 1-55 | ALL | Windows XP | 9 |
| Patrons | Fans; Rowdy; Drunk;... | ALL | 6 | ALL | ALL | ALL | iOS; Android | 15 |
| Staff Service | Employees; Staff; Usher;... | Bad; Good;... | 1 | ALL | ALL | ALL | iOS; Android | 2 |
| Seats | Uncomfortable; Cushion;... | ALL | 2 | ALL | 18-30 | ALL | iOS; Android | 7 |
| Prices | Expensive; Cheap;... | ALL | 3 | ALL | ALL | $0-$60,000 | iOS; Android | 3 |
| {Text Answer Format} | ALL | Very Good; Very Bad;... | ALL | ALL | ALL | ALL | Android | 1 |

Fig. 5B

DYNAMIC CHOICE REFERENCE LIST

BACKGROUND

Digital content providers increasingly distribute digital surveys and other digital content to network users and other audiences. As digital content proliferates, digital content providers find both a virtually boundless amount of user data and digital survey participation from users using numerous computing devices. This increase in both user data and digital survey participation from users complicates the administration of digital surveys.

Digital surveys present a unique challenge to survey administrators because the increase in both user data and digital survey participation, often time, creates difficulties in managing and generating digital surveys that are relevant for individual users. For example, survey administrators, often times, provide digital surveys to large groups of survey participants. In order to provide digital surveys that are relevant to individual users in a large survey groups, survey administrators often create digital surveys with branching questions and answer choices.

However, creating digital surveys with branching questions and answer choices can result in computing inefficiencies. For instance, conventional digital survey systems store logic for each individual response and store questions for each possible individual branch. As a result, conventional digital survey systems can create and store compounding branches of digital survey questions which result in compounding amounts of data storage and data processing. For example, conventional digital survey systems may store hundreds of questions each with unique answer choice options in compounding branches to attempt to provide a digital survey of ten questions that is relevant to each user.

Additionally, oftentimes, digital surveys generated by conventional digital survey systems are inflexible. For example, conventional digital survey systems sometimes are limited in the number of possible answer choices that can be provided for a digital survey question by a compounding branch of digital survey questions and answer choices. Indeed, oftentimes, conventional digital survey systems cannot provide relevant digital survey answer choices for a digital survey question to a user because the conventional digital survey system is limited to providing answer choices available in the compounding branch of digital survey questions and answer choices.

Also, some conventional digital survey systems are unable to efficiently export or import digital survey questions and/or digital survey answers to other digital surveys due to the rigidness of conventional digital survey systems. For example, oftentimes, conventional digital survey systems utilize compounding branches of digital survey questions and/or digital survey answer choices, and therefore, cannot efficiently export or import the digital survey questions and/or digital survey answer choices because the digital questions and answers are strongly tied to a particular question logic of a particular digital survey, and therefore, a survey administrator often would simply need to recreate survey questions taking time as well as additional computational resources.

Moreover, conventional digital survey systems are often unable to administer relevant digital surveys to users, and therefore, the accuracy and usefulness of response data is often compromised in conventional systems. Indeed, despite attempts to use branching question logic to provide relevant survey questions and answer choices, the ability to customize a digital survey using branching logic of conventional systems is ultimately limited because the question logic becomes too complicated and/or the number of questions needed becomes unmanageable for survey administrators. Accordingly, due to the rigidness of the answer choices in conventional digital survey questions, conventional digital survey systems are often unable to provide relevant digital survey questions and answer choices to a user which results in irrelevant digital surveys for a user and inaccurate survey results for a survey administrator.

Accordingly, these and other disadvantages decrease the utility of conventional digital survey systems.

SUMMARY

This disclosure describes solutions to some or all of the foregoing problems with systems, methods, and non-transitory computer-readable media that administer a digital survey to respondents of the digital survey. For instance, the disclosed systems and methods dynamically select answer choices for a digital survey from potential answer choices to generate the digital survey. Indeed, the disclosed systems and methods analyze a response to a digital survey question and/or embedded user data of the respondent to select answer choices from potential answer choices for other digital survey questions in a digital survey. The disclosed systems and methods then provide the digital survey question, that includes the selected answer choices from the potential answer choices, to a client device associated with the respondent. By selecting answer choices from the potential answer choices for a digital survey question based on other digital survey responses and/or embedded user data, the disclosed systems and methods provide a digital survey that is more relevant to respondents, results in more accurate responses, and utilizes less computational resources.

For example, in some embodiments, the disclosed systems and methods provide a digital survey question to a respondent device. Furthermore, in one or more embodiments, the disclosed systems and methods receive a response from the respondent device for the digital survey question. Based on the received digital response and/or embedded user data from the respondent device, the disclosed systems and methods, in some embodiments, can select one or more answer choices for a second digital survey question from potential answer choices. In addition, in one or more embodiments, the disclosed systems and methods can provide the second digital survey question comprising the selected one or more answer choices to the respondent device. Accordingly, the disclosed systems and methods can provide the respondent device with a digital survey comprising answer choices that are most relevant to the respondent.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description is described with reference to the accompanying drawings in which:

FIGS. 4A-4C illustrate selecting answer choices from potential answer choices for a digital question based on a multiple choice response in accordance with one or more embodiments;

FIGS. 5A-5C illustrate selecting answer choices from potential answer choices for a digital question based on a text response in accordance with one or more embodiments;

DETAILED DESCRIPTION

Figure 1:
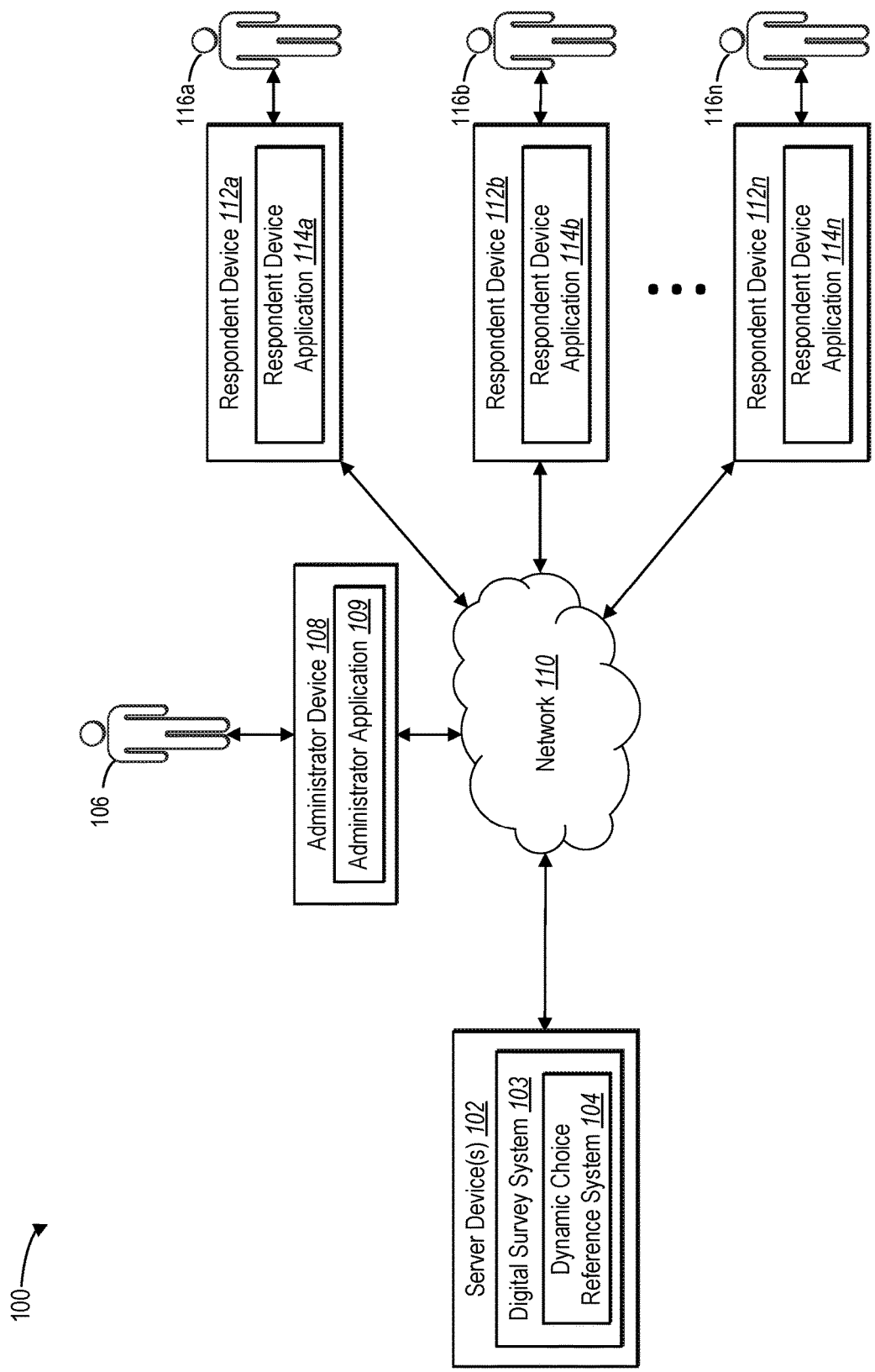
FIG. 1 illustrates a block diagram of an environment for implementing a dynamic choice reference system within a digital survey system in accordance with one or more embodiments.

This disclosure describes one or more embodiments of a dynamic choice reference system that generates a digital survey for a respondent device by selecting answer choices for digital survey questions from potential answer choices based on digital survey responses and/or embedded user data from the respondent device. By selecting answer choices for digital survey questions from the potential answer choices based on other digital survey responses from the respondent device, the dynamic choice reference system generates digital surveys with digital survey questions that are more relevant to respondents and result in more accurate responses for the digital survey questions. Moreover, the dynamic choice reference system can generate digital surveys that are relevant to respondents without utilizing compounding branches of digital survey questions.

For instance, in one or more embodiments, the dynamic choice reference system generates a list of potential answer choices within a dynamic choice reference dataset. Each of the plurality of answer choices within the list of potential answer choices are mapped to, or otherwise associated with, characteristics of a response and/or user data to allow the dynamic choice reference system to identify answer choices from the list of potential answer choices based on response and/or user data received from a respondent device. For example, in some embodiments, the dynamic choice reference system receives responses to digital survey questions and/or embedded user data from respondent devices as part of administering a digital survey. The dynamic choice reference system can utilize the digital survey responses and/or embedded user data to select answer choices from potential answer choices for other digital survey questions.

For example, in some embodiments, the dynamic choice reference system receives a multiple choice response for a digital survey question that comprises a dynamic choice reference tag. Based the dynamic choice reference tag, the dynamic choice reference system accesses a dynamic choice reference dataset to select answer choices for a second digital survey question. For instance, in some embodiments, the dynamic choice reference system utilizes operational logic associated with the second digital survey question, the multiple choice response, the dynamic choice reference tag, and/or embedded user data to select the answer choices for the second digital survey question.

In another example, the dynamic choice reference system utilizes one or more text responses from a respondent device to select answer choices from potential answer choices for other digital survey questions. For instance, the dynamic choice reference system can receive a free form text response for a digital survey question and analyze the text response to determine keywords and/or sentiment values based on the text response. Using the keywords and/or sentiment values, the dynamic choice reference system can access a dynamic choice reference dataset to select answer choices for a second digital survey question. For example, in one or more embodiments, the dynamic choice reference system utilizes operational logic associated with the second digital survey question, the text response, the keywords and/or sentiment values determined from the text response, and/or embedded user data to select the answer choices for the second digital survey question.

Furthermore, in one or more embodiments, the dynamic choice reference system utilizes a machine-learning model with one or more text responses received from a respondent device to select answer choices from potential answer choices for other digital survey questions. For instance, the dynamic choice reference system can provide a text response received from a respondent device to the machine-learning model, trained to analyze and select answer choices for digital survey questions, to select answer choices for a second digital survey question. Indeed, in one or more embodiments, the dynamic choice reference system provides the digital text response, the second digital survey question, the potential answer choices, and/or user embedded data to the machine-learning model. Based on the various inputs, the machine-learning model can select one or more answer choices for the second digital survey question.

Additionally, the dynamic choice reference system can provide a respondent with one or more digital survey questions comprising answer choices selected by the dynamic choice reference system. Indeed, in one or more embodiments, the dynamic choice reference system can utilize one or more of the approaches described herein to select answer choices from potential answer choices for a second digital survey question based on a multiple choice response, text response, the second digital survey question, and/or the user embedded data. Then, the dynamic choice reference system can provide the second digital survey question and the selected answer choices to the respondent device.

By selecting answer choices for digital survey questions from potential answer choices based on responses and/or embedded user data from the respondent device, the dynamic choice reference system can more efficiently generate digital surveys that are relevant to a respondent compared to conventional systems. For instance, by selecting answer choices from potential answer choices based on responses from the respondent device, the dynamic choice reference system does not utilize compounding branches of digital questions. Indeed, the dynamic choice reference system can select answer choices for a set of digital survey questions without having to store multiple instances of the same digital survey questions with different answer choice combinations.

In addition to computer storage efficiency, the dynamic choice reference system utilizes less computational resources than some conventional systems by performing fewer steps. For example, various embodiments of the dynamic choice reference system do not generate multiple instances of the same digital survey question with different answer choice combinations by selecting answer choices for a digital survey question from potential answer choices based on digital responses from a respondent. As a result, the dynamic choice reference system is able to generate a digital survey question comprising any combination of answer choices with less computational steps than generating compounding branches of digital survey questions with different answer choice combinations.

Moreover, the dynamic choice reference system can generate digital surveys that are more flexible when compared to conventional systems. Indeed, in some conventional digital survey systems, digital surveys are rigid because the digital surveys are limited to the one or more pre-determined answer choice combinations available for each digital survey question. In contrast, the dynamic choice reference system can select answer choices for digital survey questions that are most relevant to a respondent by selecting answer choices from the potential answer choices based on digital responses provided by the respondent and/or user embedded data of the respondent. Thus, the dynamic choice reference system can generate digital surveys that are robust and more relevant to respondents compared to conventional systems.

Furthermore, the dynamic choice reference system can efficiently export or import digital survey questions and answers. For instance, some conventional digital survey systems cannot efficiently export or import digital survey questions and answers to other digital surveys because of the complexity of compounding branches of digital survey questions with different answer choice combinations and the large size of having such compounding branches. By utilizing a list of potential answer choices and operational logic associated with digital questions, the dynamic choice reference system can export or import digital questions and digital answers to other digital surveys easily and efficiently. Indeed, in some embodiments, by selecting answer choices from potential answer choices based on responses, the dynamic choice reference system can export or import digital questions and/or digital answers to other digital surveys because the dynamic choice reference system 104 does not need to utilize compounding branches of digital questions and/or digital answers. Furthermore, the dynamic choice reference system can utilize less storage space by utilizing a list of potential answer choices and digital questions comprising operational logic, and therefore, can export or import digital questions and/or digital answers to other digital surveys more efficiently.

Additionally, by utilizing the dynamic choice reference system to generate more flexible digital surveys, the dynamic choice reference system can receive more accurate digital survey responses from respondents. For instance, in some conventional systems, the rigid answer choices provided for a digital survey question may not be relevant to the respondent. Thus, the respondent, oftentimes, will select an incorrect answer choice for the sake of selecting an answer and/or skip the digital survey question entirely in conventional systems. Accordingly, by selecting answer choices from potential answer choices based on digital responses from respondents and/or user embedded data, the dynamic choice reference system is more likely to generate digital surveys that result in accurate responses because the selected answer choices for the digital survey questions are more relevant to the respondent.

As illustrated by the foregoing discussion, the present disclosure utilizes a variety of terms to describe features and benefits of the unsolicited response system. Additional detail is now provided regarding the meaning of these terms that will be used throughout this disclosure. As used herein, the term "digital survey" refers to a digital communication that collects information concerning one or more respondents by capturing information from such respondents. Furthermore, "digital survey" refers to a set of digital survey questions or content intended for distribution over a network by way of respondent devices and further intended to collect responses to the digital survey questions for generating survey results from the collected responses. A digital survey can include one or more digital survey questions and corresponding answer choices that accompany the given question. Additionally, a digital survey can comprise answer choices selected by the dynamic choice reference system 104.

Moreover, as used herein, the term "digital survey question" (or sometimes "digital question," "question," or "survey question") refers to a prompt included in a digital survey that invokes a response from a respondent, or that requests information from a respondent. In one or more embodiments, when one or more answer choices are available for a digital survey question, a digital survey question may include a question portion as well as an available answer choice portion that corresponds to the survey question. For example, a digital survey question can comprise prompts such as "how was your dining experience" or "please select your favorite products."

As used herein, the term "answer choice" (or sometimes "digital answer choice," "digital answer," "digital survey answer," or "answer") refers to an input prompt for a digital survey. In particular, the term "answer choice" refers to selectable options that represent possible responses to a question. For instance, an answer choice can comprise selectable options such as "one," "five," "ten," or "eleven" to the question: "how many times do you brush your teeth per week?" Additionally, an answer choice can comprise an answer format such as a text box that receives text input from a respondent device.

Furthermore, as used herein, the term "response" (or sometimes "digital response" or "survey response") refers to a selection or input provided by a respondent device corresponding to a digital question. Depending on the digital question type, the digital survey response may include, but is not limited to, a selection, a text input, an indication of an answer, an actual answer, and/or an attachment. More specifically, the term "response" refers to a selection of an answer choice corresponding to a digital question received from a respondent device and/or input received from a respondent device for a digital question as a multiple choice selection. Indeed, as used herein, the term "multiple choice selection" refers to the selection of one or more answer choices from a group of selectable answer choices corresponding to a digital question. For example, a response can comprise the selection of the answer choice "ten" for the question: "how many times do you brush your teeth per week?"

Additionally, a response can also comprise a text response. Indeed, as used herein, the term "text response" refers to text input received from a respondent device. In particular, the term "text response" refers to text input provided by a respondent device in a text box corresponding to a digital question. For example, a text response can comprise text such as "I like comedy, action, and horror" received from a respondent device in a text box corresponding to the digital question "what are your favorite movie genres?"

Moreover, as used herein, the term "embedded user data" refers to information corresponding to a respondent of a respondent device. In particular, the term "embedded user data" refers to information that corresponds to characteristics of a respondent, characteristics of a respondent device of the respondent, data that is created from user interactions with a respondent device, and other information that is associated with the respondent. For example, embedded user data can include, but is not limited to, demographic information of a respondent, respondent device information for respondent devices operated by the respondent, contact information of a respondent, employment information of a respondent, and browser cookie data of a respondent. Indeed, embedded user data can include data such as a geographic location of a respondent, languages spoken by the respondent, the age of the respondent, the gender of the respondent, the employer of the respondent, and the respondent device model of the respondent. Furthermore, embedded user data can also include profile information for a respondent from other third party websites.

As used herein, the term "potential answer choices" refers to vocabulary and/or other data representing possible answer choices for one or more digital questions. In particular, the term "potential answer choices" refers to a dataset, list, and or collection of words, numbers, formats, and/or other forms of input that can be provided as answer choices and/or answer formats to a digital question. For example, potential answer choices can include a list of possible vocabulary (i.e., words and/or numbers) that can be selected as a response to a digital question. Furthermore, potential answer choices can include a list of possible formats that can be provided with a digital question as a way to input a response to the digital question. Furthermore, potential answer choices can be represented in a dynamic choice reference dataset as described below in FIGS. 4 and 5.

Furthermore, as used herein, the term "operational logic" refers to instructions that utilize logic to select and/or filter information. In particular, the term "operational logic" refers to instructions that are associated with digital questions that utilize operators such as, but not limited to, AND, OR, and NOT to select and/or filter information such as potential answer choices for the digital question. For example, operational logic can include instructions that select answer choices from potential answer choices when a specific response is received to the dynamic choice reference system for another digital question. Furthermore, operational logic can also include instructions that select answer choices from potential answer choices when specific embedded user data is provided by the dynamic choice reference system 104. Additionally, operational logic can also include other preferences and/or overrides. Operational logic is described in further detail in FIGS. 4 and 5.

Turning now to the figures, FIG. 1 provides an overview of an environment 100 in which a dynamic choice reference system 104 can operate. After providing an overview of the environment 100, this disclosure describes embodiments of the dynamic choice reference system 104 in more detail with reference to FIGS. 2-7. As illustrated in FIG. 1, the environment 100 includes an administrator device 108 associated with a survey administrator 106, the administer device having an admin application 109 that allows the survey administrator to access the digital survey system 103. The environment 100 further includes respondent devices 112*a*-112*n* (collectively referred to as "respondent devices 112") that are respectively associated with survey respondents 116*a*-116*n* (collectively referred to as "survey respondents 116"). Each of the respondent devices 112*a*-112*n* likewise respectively comprise respondent device application 114*a*-114*n* (collectively referred to as the "respondent device applications 114"). The survey respondents 116 may interact with the respondent device applications 114 to respond to digital survey questions. In some embodiments, the admin application 109 and respondent device applications 114 comprise web browsers, applets, dedicated applications (e.g., dedicated digital survey applications), instant message applications, SMS applications, email applications, and/or other software applications that perform the functions described herein.

As used in this disclosure, the term "respondent" (or sometimes "user") refers to any person that is the subject of a survey. In particular, the term "respondent" refers to a person that is sent a digital survey. Specifically, a respondent 116 includes a person that receives a digital survey and is expected to provide a response to the digital survey. For example, a respondent 116 can include a person that shops at a retail store and receives a digital survey from the retail store. Moreover, as used in this disclosure, the term "client device" or "respondent device" refers to any device that can display a digital survey. In particular, a client device includes computing devices that can display a digital survey for a respondent. Specifically, a client device includes, but is not limited to, smart home devices, computers, smartphones, tablets, and digital kiosks.

In general, the administrator device 108 and the respondent devices 112 communicate with server device(s) 102, including the digital survey system 103 with the dynamic choice reference system 104, over a network 110. As described below, the server device(s) 102 enable various functions, features, processes, methods, and systems described herein using, for example, the dynamic choice reference system 104. Additionally, the server device(s) 102 coordinate with the administrator device 108 and the respondent devices 112 to perform or provide the various functions, features, processes, methods, and systems described in more detail below. Although FIG. 1 illustrates a particular arrangement of the server device(s) 102, the administrator device 108, the respondent devices 112, and the network 110, additional arrangements are possible. For example, the server device(s) 102 and the dynamic choice reference system 104 may directly communicate with the administrator device 108 and thus bypass the network 110.

Within the arrangement shown in FIG. 1, the administrator device 108 and the respondent devices 112 can include any one of various types of client devices. For instance, the administrator device 108 and the respondent devices 112 can be mobile devices, tablets, laptop computers, desktop computers, smart televisions, televisions, monitors, smart home devices, digital kiosks, or any other type of computer device, as further explained below with reference to FIG. 10.

Additionally, the server device(s) 102 can include one or more computing devices, including those explained below with reference to FIG. 9. The administrator device 108, the respondent devices 112, server device(s) 102, and network 110 may communicate using any communication platforms and technologies suitable for transporting data and/or communication signals, including any known communication technologies, devices, media, and protocols supportive of data communications, examples of which are described with reference to FIG. 10.

As an overview of the environment 100, the server device(s) 102 provide the administrator device 108 access to the digital survey system 103 and the dynamic choice reference system 104 through the network 110. The digital survey system 103 and the dynamic choice reference system 104 provides tools, interfaces, and functionality to the administrator device 108 to compose digital surveys, digital survey questions, operational logic for digital questions, and potential answer choices for the dynamic choice reference system 104.

Furthermore, the server device(s) 102 provide the respondent devices 112 access to the digital survey system 103 and dynamic choice reference system 104 through network 110. The digital survey system 103, in one or more embodiments, provides digital surveys comprising digital survey questions and digital answer choices that are determined by the dynamic choice reference system 104 to the respondent devices 112. Additionally, the digital survey system 103 and dynamic choice reference system 104 can receive digital responses corresponding to the digital survey questions from the respondent devices 112 and store the digital responses on the server device(s) 102. Moreover, the respondent devices 112 can also provide embedded user data to the dynamic choice reference system 104, as will be described in additional detail below.

Additionally, the dynamic choice reference system 104 can select one or more answer choices from potential answer choices for a digital question and provide the digital question with the selected answer choices to respondent devices 112. For example, in some embodiments, the dynamic choice reference system 104 utilizes the digital survey questions, the operational logic for digital questions, and the potential answer choices (i.e., a list of potential answer choices) provided by the administrator device 108 and digital responses provided by the respondent devices 112 to select one or more answer choices for a digital question from potential answer choices. Furthermore, the dynamic choice reference system 104 can also utilize the embedded user data provided by the respondent devices 112 to select one or more answer choices for a digital question from the potential answer choices.

As just mentioned, the dynamic choice reference system 104 can select answer choices from potential answer choices for a digital question based on a response and/or embedded user data of a respondent. Indeed, the dynamic choice reference system 104 provides a digital question to a respondent device, receives a response to the digital question from the respondent device, and accesses potential answer choices for a second digital question to select answer choices for the second digital question based on the received response. Furthermore, the dynamic choice reference system 104 also provides a second digital question with selected answer choices to a respondent device.

Figure 2:
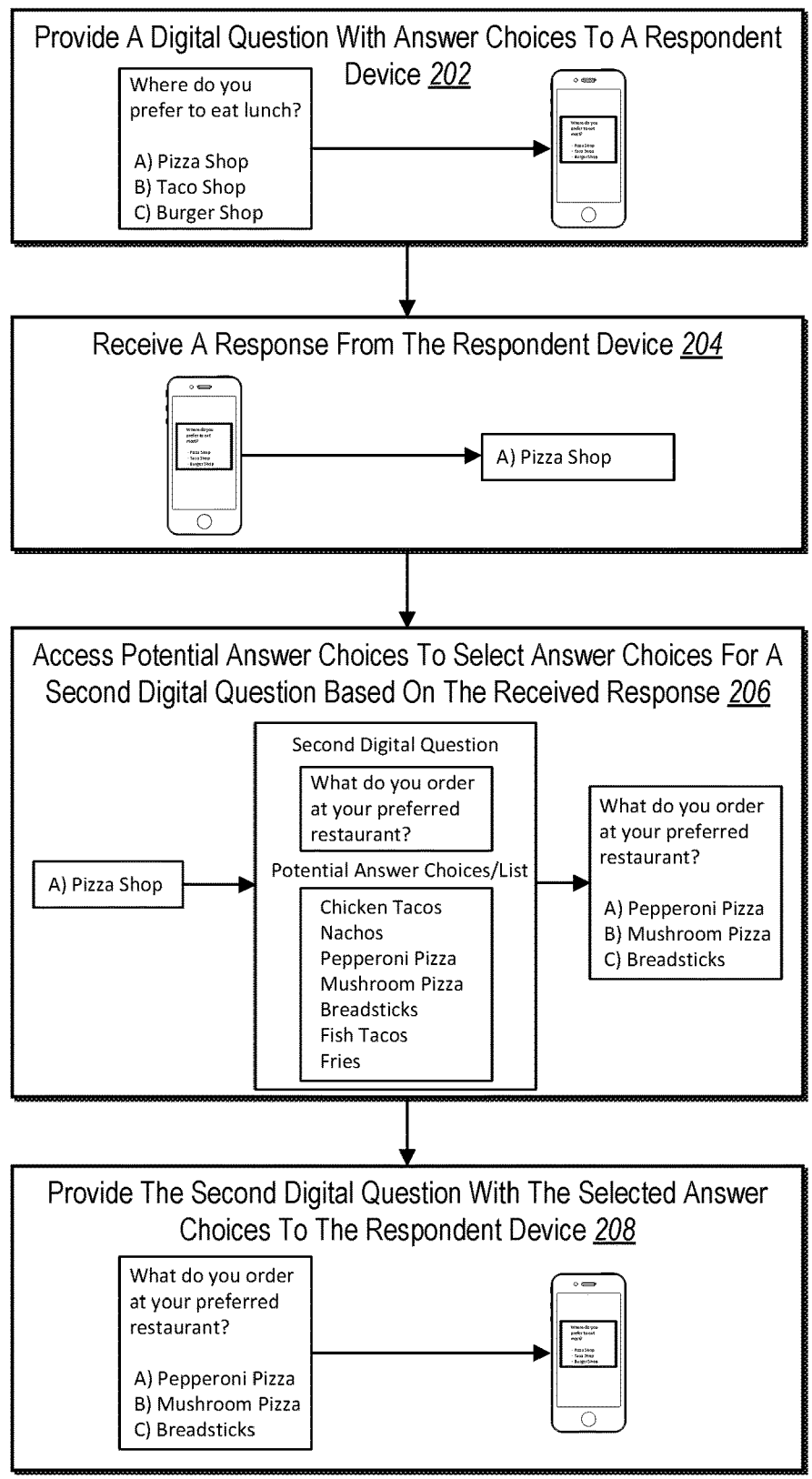
FIG. 2 illustrates a flow chart for selecting answer choices from potential answer choices for a digital question in accordance with one or more embodiments.

For example, FIG. 2 illustrates an overview of the dynamic choice reference system 104. In particular, as shown in FIG. 2, the dynamic choice reference system 104 performs an act 202 of providing a digital question to a respondent device 112a. For instance, as shown in FIG. 2, the dynamic choice reference system 104 provides the digital question with multiple choice selections in act 202. Indeed, as shown in FIG. 2, the dynamic choice reference system 104 provides a digital question "Where do you prefer to eat lunch?" with answer choices: "A) Pizza Shop; B) Taco Shop; and C) Burger Shop" to the respondent device 112a.

Furthermore, in some embodiments, the dynamic choice reference system 104 provides a digital question with a text box for a text response option. Additionally, in some embodiments, the dynamic choice reference system 104 provides a digital question with answer choices that are selected by the dynamic choice reference system 104 based on prior responses from a respondent device and/or based on embedded user data of the respondent device.

In addition to providing the digital question to the respondent device 112a, the dynamic choice reference system 104 also performs an act 204 of receiving a response from the respondent device 112a. For instance, the dynamic choice reference system 104 can receive an answer choice chosen by a respondent from multiple choice selections on a respondent device as the response. Indeed, as shown in FIG. 2, the dynamic choice reference system 104 receives the answer choice of "A) Pizza Shop" from the respondent device 112a as the response to the digital question. In one or more embodiments, the dynamic choice reference system 104 receives a text response from the respondent device 112a. Moreover, in some embodiments, the dynamic choice reference system 104 also receives embedded user data and/or a respondent identifier for a respondent from a respondent device.

Furthermore, as shown in FIG. 2, the dynamic choice reference system 104 performs an act 206 of accessing potential answer choices for a second digital question to select answer choices for a second digital question based on the received response. Indeed, as shown in FIG. 2, the dynamic choice reference system 104 utilizes the received response "A) Pizza Shop" to select answer choices "A) Pepperoni Pizza, B) Mushroom Pizza, and C) Breadsticks" from the potential answer choice list for the second digital question: "What do you order at your preferred restaurant?" For example, the dynamic choice reference system 104 can access a list of potential answer choices associated with a second digital question based on a received response from a respondent device. Moreover, in some embodiments, the dynamic choice reference system 104 also utilizes embedded user data to select answer choices for a second digital question from potential answer choices.

Indeed, the dynamic choice reference system 104 can select answer choices for a second digital question from potential answer choices based on the received response by utilizing various approaches. For example, in some embodiments, the dynamic choice reference system 104 utilizes response tags (sometimes referred to as "tags") associated with a received response to select answer choices from potential answer choices for a second digital question as described in FIG. 4. Moreover, in one or more embodiments, the dynamic choice reference system 104 utilizes determined keywords and/or sentiment values from a received text response from a respondent device to select answer choices from potential answer choices for a second digital question as described in FIG. 5. Furthermore, in some embodiments, the dynamic choice reference system 104 utilizes a machine-learning model to select answer choices from potential answer choices for a second digital question as described in FIGS. 6 and 7.

As further shown in FIG. 2, the dynamic choice reference system 104 performs an act 208 of providing the second digital question with the selected answer choices to the respondent device 112a. For example, as shown in FIG. 2, the dynamic choice reference system 104 provides the second digital question "What do you order at your preferred restaurant?" with the selected answer choices, from act 206, "A) Pepperoni Pizza, B) Mushroom Pizza, and C) Breadsticks" to the respondent device 112a. Indeed, the dynamic choice reference system 104 can provide multiple digital questions with selected answer choices from the potential answer choices to a respondent device.

As illustrated in FIG. 2, the dynamic choice reference system 104 allows a survey administrator to create a single question (e.g., What do you order at your preferred restaurant?) and then associated a large number of potential answer choices with that single question. Then, based on operational logic and/or one or more relational rules, the dynamic choice reference system 104 customizes the answer choices for the question based on response data and/or user data associated with the respondent. The dynamic choice reference system 104 then generates the customized survey question with the selected answer choices and provides the customized question to the respondent. In this way the dynamic choice reference system reduces the complexity of administering a digital survey for the survey administrator, and at the same time, provides a more relevant survey to the respondent that allows the respondent to easily provide answers to relevant questions.

Figure 3:
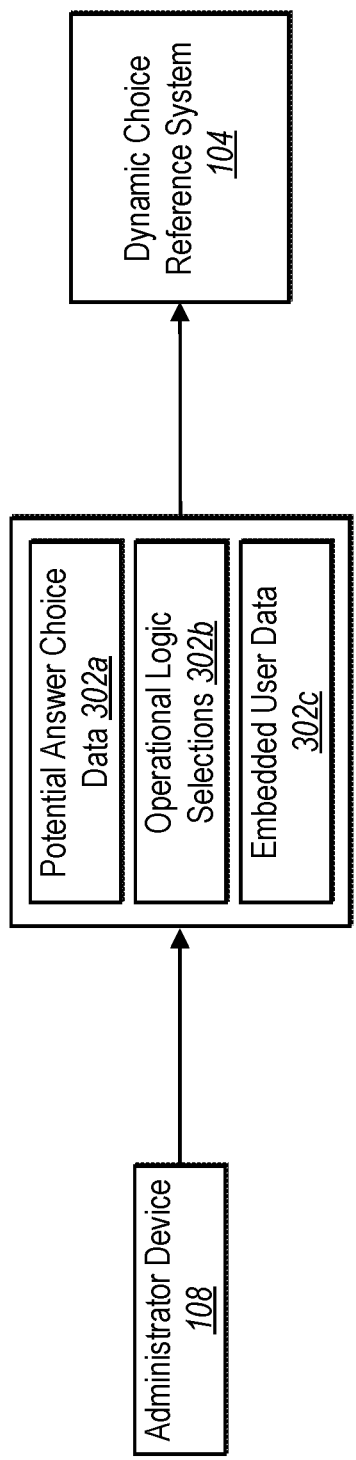
FIG. 3 illustrates a flow chart of generating potential answer choice data, operational logic, and embedded user data for a dynamic choice reference system in accordance with one or more embodiments.

In one or more embodiments, the dynamic choice reference system 104 receives potential answer choices from an administrator device 108. For instance, as shown in FIG. 3, the dynamic choice reference system 104 receives potential answer choice data 302a, operational logic selections 302b (for digital questions), and/or embedded user data 302c from the administrator device 108. Indeed, in one or more embodiments, the dynamic choice reference system 104 provides tools to an administrator device 108 for generating potential answer choices, operational logic for digital questions, and/or embedded user data for the dynamic choice reference system 104. Additionally, in some embodiments, the dynamic choice reference system 104 generates the potential answer choices and operational logic for digital questions for a digital survey.

In one or more embodiments, the administrator device 108 includes a third party digital survey client, a third party word generator, and/or a third party application. For example, in some embodiments, the administrator device 108 includes a third party digital survey client that provides the dynamic choice reference system 104 with information such as potential answer choice data, operational logic for digital questions, and/or embedded user data to generate digital surveys. Moreover, the dynamic choice reference system 104 can obtain potential answer choice data from a third party word generator and/or a third party application.

Furthermore, the dynamic choice reference system 104 can receive potential answer choice data. For example, as shown in FIG. 3, an administrator device 108 provides potential answer choice data 302a to the dynamic choice reference system 104. Indeed, in one or more embodiments, the dynamic choice reference system 104 can receive input from the administrator device 108 for potential answer choices and the digital questions that are associated with the potential answer choices. Furthermore, in one or more embodiments, the dynamic choice reference system 104 can obtain a library of potential answer choice data from an administrator device 108. In some embodiments, potential answer choice data comprises data that is created by and is associated with the administrator device 108. For example, the administrator 106 for the administrator device 108 can be a car manufacturer and provide a list of car manufacturers and car models as potential answer choice data.

Additionally, in one or more embodiments, the administrator device 108 provides other information associated with potential answer choice data. For instance, the dynamic choice reference system 104 can receive information such as associations of dynamic choice tags, keywords, sentiment values, and embedded user data with potential answer choice data. Furthermore, the dynamic choice reference system 104 can receive a dynamic choice reference dataset from the administrator device 108. Indeed, in some embodiments, the administrator device 108 can provide a dynamic choice reference dataset as described in FIGS. 4 and 5.

Moreover, the dynamic choice reference system 104 can also generate potential answer choice data and/or potential answer choice data libraries. In particular, in one or more embodiments, the dynamic choice reference system 104 can collect words and answer choice data to generate potential answer choice data. Furthermore, the dynamic choice reference system 104 can also generate a library of potential answer choice data for various digital survey topics. More specifically, the dynamic choice reference system 104 can collect potential answer choice data for words associated with various topics and generate a potential answer choice data library specific to the topics. For example, the dynamic choice reference system 104 can collect potential answer choice data for the car industry and generate a car industry potential answer choice data library. Furthermore, the dynamic choice reference system 104 can also associate dynamic choice tags, keywords, sentiment values, and embedded user data with potential answer choice data. Additionally, potential answer choices can include a list of answer choices in any language. Indeed, the dynamic choice reference system 104 can translate potential answer choices of one language into other languages.

In some embodiments, the dynamic choice reference system 104 also updates potential answer choice data. For instance, the dynamic choice reference system 104 can receive information from an administrator device 108 and/or respondent devices 112 to update potential answer choice data. In some embodiments, the dynamic choice reference system 104 can update potential answer choice data based on trends over time related to the way respondents have answer digital questions corresponding to the potential answer choice data. In one or more embodiments, the dynamic choice reference system 104 can receive such trends and/or updated potential answer choice data from an administrator device 108.

Moreover, the dynamic choice reference system 104 can receive operational logic for digital questions. For instance, as shown in FIG. 3, the dynamic choice reference system 104 receives operational logic selections 302b for digital questions from the administrator device 108. For example, the dynamic choice reference system 104 can provide tools to select and associate operational logic with digital questions of a digital survey to the administrator device 108. Indeed, in some embodiments, the dynamic choice reference system 104 utilizes the operational logic to select answer choices from potential answer choices associated with a digital question as described in FIGS. 4 and 5.

Additionally, the dynamic choice reference system 104 can receive embedded user data. For instance, as shown in FIG. 3, the dynamic choice reference system 104 receives embedded user data 302c from the administrator device 108. For example, in one or more embodiments, the dynamic choice reference system 104 can receive embedded user data from the administrator device 108 for respondents that are targeted by the digital survey requested by the administrator device 108. In some embodiments, the dynamic choice reference system 104 can store embedded user data for respondents on the server device(s) 102. Indeed, in some embodiments, the dynamic choice reference system 104 receives embedded user data with respondent identifiers from the administrator device 108 so that the dynamic choice reference system 104 can reference the embedded user data of a respondent when selecting answer choices from potential answer choice data for a specific respondent.

Figure 4A:
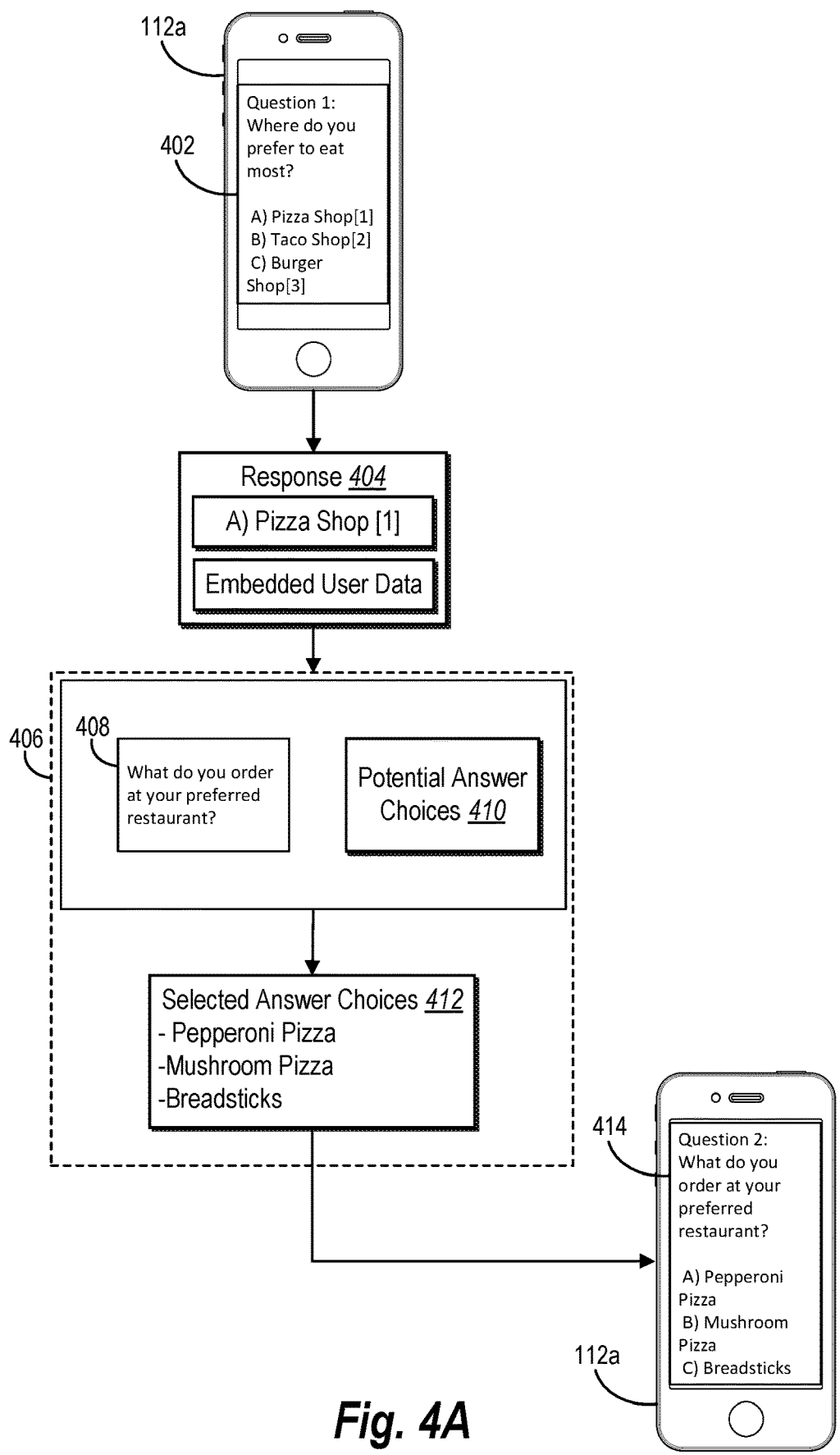
Figure 4C:
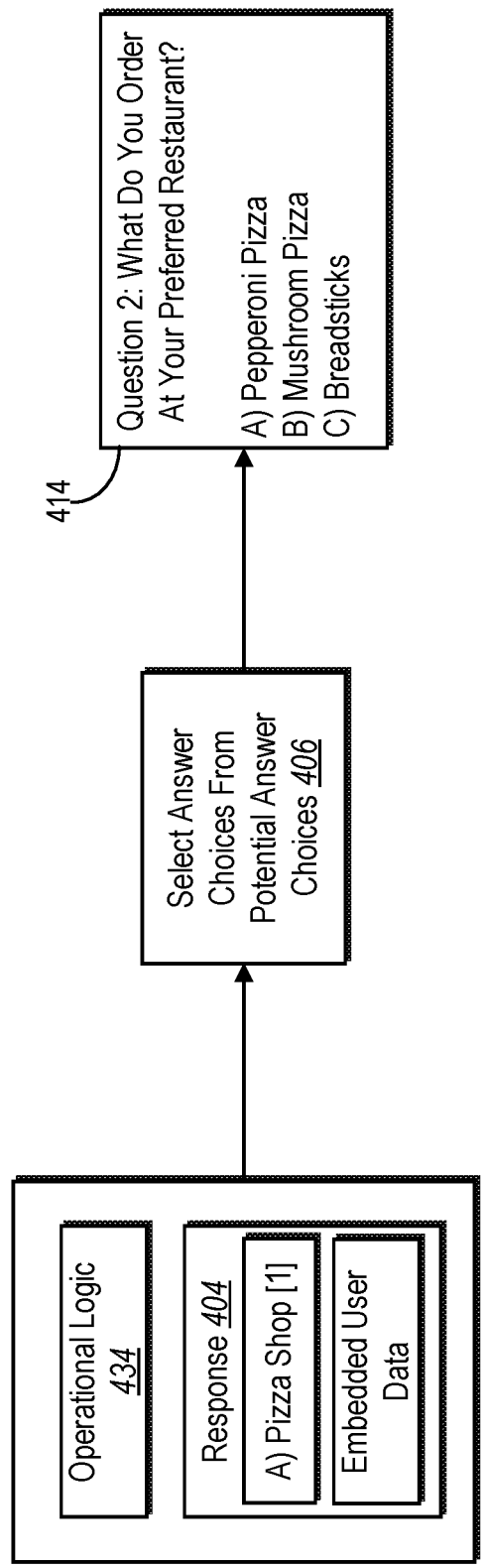

As mentioned, the dynamic choice reference system 104 can access potential answer choices to select answer choices for a second digital question based on a received multiple choice response. For example, as shown in FIGS. 4A-4C, the dynamic choice reference system 104 can select answer choices from potential answer choices for a second digital question based on a received multiple choice response by utilizing tags associated with the received response. For instance, FIG. 4A illustrates an overview of the dynamic choice reference system 104 selecting answer choices from potential answer choices for a second digital question based on a received multiple choice response. Additionally, as shown in FIG. 4B, the dynamic choice reference system 104 can access a dynamic choice reference dataset in order to select answer choices from potential answer choices for a second digital question. Furthermore, as illustrated in FIG. 4C, the dynamic choice reference system 104 can select answer choices for the second digital question based on operational logic associated with the second digital question, the received response, and/or embedded user data from a respondent device.

In one or more embodiments, the dynamic choice reference system 104 selects answer choices from potential answer choices for a second digital question based on a multiple choice response received from a respondent device. Indeed, as illustrated in FIG. 4A, the dynamic choice reference system 104 can provide a digital question to a respondent device and receive a response from the respondent device, such as an answer choice selection from the respondent device to the digital question and embedded user data from the respondent device. Furthermore, as illustrated in FIG. 4A, the dynamic choice reference system 104 can utilize a response to the digital question and embedded user data to select answer choices for a second digital question. For instance, as shown in FIG. 4A, the dynamic choice reference system 104 can select answer choices for the second digital question by utilizing the second digital question and potential answer choices. Additionally, as shown in FIG. 4A, the dynamic choice reference system 104 can provide the selected answer choices and second digital question to a respondent device.

Indeed, the dynamic choice reference system 104 can provide a digital question with multiple choice answer choices to a respondent device. In particular, as shown in FIG. 4A, the dynamic choice reference system 104 provides a digital question 402 (with multiple choice answer choices) to a respondent device 112a. Furthermore, the dynamic choice reference system 104 can provide a digital question with multiple choice answer choices that are pre-selected as initial answer choices in a digital survey. In some embodiments, the dynamic choice reference system 104 provides the digital question with multiple choice answer choices that are selected by the dynamic choice reference system 104 by the various methods described in FIGS. 4-7.

For example, the dynamic choice reference system 104 can provide the digital question with the multiple choice answer choices after selecting the answer choices for the digital question by selecting answer choices from potential answer choices based on prior responses from a respondent device and/or embedded user data from a respondent device as described in FIG. 4C. Additionally, the dynamic choice reference system 104 can provide the digital question 402 (with the multiple choice answer choices) after selecting answer choices for the digital question based on a text response and/or embedded user data as described in FIG. 5. Furthermore, the dynamic choice reference system 104 can also provide the digital question 402 (with the multiple choice answer choices) after selecting answer choices for the digital question by utilizing a machine-learning model as described in FIG. 6.

Additionally, the dynamic choice reference system 104 can associate tags with answer choices. For example, as shown in FIG. 4A, the dynamic choice reference system 104 associates numerical response tags with the answer choices provided with the digital question 402. Indeed, as illustrated in FIG. 4A, the dynamic choice reference system 104 associates a tag of "1" with the first answer choice "A) Pizza Shop," a tag of "2" with the second answer choice "B) Taco Shop," and a tag of "3" with the third answer choice "C) Burger Shop." Furthermore, referring to the example in FIG. 4, in one or more embodiments, the tag "1" can be associated with potential answer choices that correspond to "pizza shop" related food items, the tag "2" can be associated with potential answer choices that correspond to "taco shop" related food items, and the tag "3" can be associated with the potential answer choices that correspond to "burger shop" related food items. Moreover, in one or more embodiments, the dynamic choice reference system 104 associates response tags with answer choices without making the response tags visible on the display of a respondent device.

Also, in one or more embodiments, the dynamic choice reference system 104 corresponds the response tags to groupings such as, but not limited to, categories of answer choices and/or topics. Furthermore, in some embodiments, the dynamic choice reference system 104 can represent the response tags with various types of representations. For instance, in one or more embodiments, the dynamic choice reference system 104 can represent the response tags as alphabetical, numerical, and/or alphanumerical identifiers that correspond to groupings such as, but not limited to, categories of answer choices, specific answer choices, and/or topics. Furthermore, in some embodiments, the dynamic choice reference system 104 can utilize a response tag to select answer choices from potential answer choices by filtering the answer choices based on response tags associated with the potential answer choices. In one or more embodiments, response tags can be represented as dynamic choice tags that correspond to answer choices in a dynamic choice reference dataset as shown in FIG. 4B.

Moreover, in one or more embodiments, the dynamic choice reference system 104 can utilize the answer choice selection in a response from a respondent device as a response tag (i.e., answer selections "A," "B," and "C" in FIG. 4A). For example, the dynamic choice reference system 104 can correspond each answer selection in a response as a tag that corresponds to groupings such as, but not limited to, categories of answer choices, specific answer choices, and/or topics.

Additionally, the dynamic choice reference system 104 can receive an answer choice in a response from a respondent device. For example, as shown in FIG. 4A, the dynamic choice reference system 104 receives an answer choice selection from the respondent device 112a, "A) Pizza Shop," as the response 404 to the provided digital question 402. In addition, as illustrated in FIG. 4A, the dynamic choice reference system 104 also receives the response tag "1" associated with the answer selection in response 404. In one or more embodiments, the dynamic choice reference system 104 receives the response tag as part of a response or associates the tag with the answer selection in the response after receiving the response.

Furthermore, the dynamic choice reference system 104 can also receive embedded user data in a response from the respondent device. For example, as shown in FIG. 4A, the dynamic choice reference system 104 receives embedded user data in response 404 from the respondent device 112*a*. In one or more embodiments, the dynamic choice reference system 104 receives the embedded user data from an administrator device 108. In some embodiments, the dynamic choice reference system 104 receives a respondent identifier as part of a response from a respondent device. Moreover, the dynamic choice reference system 104 can utilize the respondent identifier to identify embedded user data that is stored on server device(s) 102, on an administrator device 108, and/or received from an administrator device 108 as described in FIG. 3.

Also, the dynamic choice reference system 104 can utilize a response to select answer choices from potential answer choices for another digital question. For example, as illustrated in FIG. 4A, the dynamic choice reference system 104 utilizes the response 404, a second digital question 408, and potential answer choices 410 to select answer choices 412 for the second digital question 408 in step 406. Indeed, as shown in FIG. 4A, the dynamic choice reference system 104 accesses potential answer choices 410 to select answer choices for the second digital question 408 "What do you order at your preferred restaurant?" based on the response 404 comprising the selection "A) Pizza Shop," the response information of tag "1," and the embedded user data. Moreover, as shown in FIG. 4A, the dynamic choice reference system 104 selects the answer choices "Pepperoni Pizza," "Mushroom Pizza," and "Breadsticks" 412 for the second digital question 408 from the potential answer choices 410 based on the response 404 in step 406.

In some embodiments, the dynamic choice reference system 104 can utilize a dynamic choice reference dataset to represent potential answer choices. Indeed, the dynamic choice reference system 104 can utilize a dynamic choice reference dataset to represent potential answer choices as described in FIG. 4B. Moreover, in one or more embodiments, the dynamic choice reference system 104 accesses potential answer choices to select answer choices for a digital question based on any combination of digital question responses, response tags, digital question operational logic, and/or embedded user data as described in FIG. 4C.

Additionally, in one or more embodiments, the dynamic choice reference system 104 can provide a digital question with select answer choices to a respondent device. For instance, as illustrated in FIG. 4A, the dynamic choice reference system 104 provides the second digital question with the selected answer choices 414 to the respondent device 112*a*. Furthermore, the dynamic choice reference system 104 can receive responses to digital questions provided with selected answer choices to select answer choices for other digital questions. For example, in one or more embodiments, the dynamic choice reference system 104 further receives a response to the digital question comprising the selected answer choices 414 from the respondent device 112*a* and selects answer choices for another digital question in accordance with the various methods described in FIGS. 4-7.

As just mentioned, the dynamic choice reference system 104 can utilize a dynamic choice reference dataset to represent potential answer choices. Indeed, FIG. 4B illustrates an exemplary dynamic choice reference dataset 416 for the dynamic choice reference system 104. For example, the dynamic choice reference system 104 can generate a dynamic choice reference dataset that comprises potential answer choices. As illustrated in FIG. 4B, the dynamic choice reference system 104 generates the exemplary dynamic choice reference dataset 416 to comprise potential answer choices 418 for food items because the digital questions of FIG. 4 correspond to food and/or restaurant themes. In one or more embodiments, the dynamic choice reference system 104 generates a dynamic choice reference dataset for any other topic and/or theme for a digital survey and the digital questions of the digital survey. Additionally, in some embodiments, the dynamic choice reference system 104 receives the dynamic choice reference dataset from an administrator device as described in FIG. 3.

Furthermore, the dynamic choice reference system 104 can generate a dynamic choice reference dataset that includes information fields associated with potential answer choices such as response tags and/or embedded user data. Indeed, as shown in FIG. 4B, the dynamic choice reference system 104 generates dynamic choice reference dataset 416 to include information fields associated with the potential answer choices 418 such as dynamic choice tags 420, country codes 422, age 424, gender 426, languages 428, operating system 430, and a rank 432. For example, as shown in FIG. 4B, the potential answer choice 418 of "mushroom pizza" is associated with dynamic choice tag 420 of "1," the country code 422 of "US," and a language 428 "English." Moreover, as shown in FIG. 4B, the potential answer choice 418 of "mushroom pizza" is also associated with all ages 424, all genders 426, and all operating system 430 (i.e., the dynamic choice reference system 104 utilizes an indicator "ALL" to represent that a potential answer choice is associated with any available option under an information field).

Additionally, the dynamic choice reference system 104 can generate a dynamic choice reference dataset with any number and/or combination of information fields beyond the information fields exemplified in FIG. 4B. For example, the dynamic choice reference system 104 can utilize information fields for the dynamic choice reference dataset such as, but not limited to, specific response selections, browser cookie information, purchase history, memberships, ethnicity, education level, profession information, devices owned, and respondent preferences. Furthermore, the dynamic choice reference system 104 can also utilize information fields for the dynamic choice reference dataset such as keywords and/or sentiment values as described in FIG. 5.

Moreover, in some embodiments, the dynamic choice reference system 104 also selects answer formats as a potential answer choice. For example, as shown in FIG. 4B, the potential answer choices 418 comprises an answer format of "Text Answer Format." Indeed, in one or more embodiments, the dynamic choice reference system 104 can select an answer format, such as a text format, for the digital question based on answer choice responses from a respondent device, operational logic, and/or embedded user data. For instance, as shown in FIG. 4B, the dynamic choice reference system 104 can select "Text Answer Format" from the potential answer choices 418 when a dynamic choice tag of "5" is received in a response from a respondent device 112*a*. Furthermore, the dynamic choice reference system 104 can provide a digital question to a respondent device with a text box instead of multiple choice answer choices after selecting a text format from potential answer choices.

Additionally, the dynamic choice reference system 104 can utilize a dynamic choice reference dataset to associate a potential answer choice with more than one type of information. For instance, as shown in FIG. 4B, the dynamic choice reference system 104 utilizes the dynamic choice reference dataset to associate the potential answer choice 418 of "gelato" with dynamic choice tags 420 of "1" and "3." Indeed, in one or more embodiments, the dynamic choice reference system 104 can generate a dynamic choice reference dataset with information fields that comprise any combination and/or number of associations with potential answer choices.

Furthermore, the dynamic choice reference system 104 can utilize combinations and/or numbers of associations with potential answer choices to select potential answer choices based on any combination of responses, operational logic of digital questions, and/or embedded user data from a dynamic choice reference dataset. For example, as shown in FIG. 4B and referring to FIG. 4A, the dynamic choice reference system 104 can utilize the associations with information fields 420-430 to select potential answer choices 418 from the dynamic choice reference dataset 416 for the second digital question 408. For instance, the dynamic choice reference system 104 can utilize responses, embedded user data, and operational logic from a digital question to select potential answer choices from a dynamic choice reference dataset as described in FIG. 4C.

As just mentioned, the dynamic choice reference system 104 can utilize responses, embedded user data, and/or operational logic from a digital question to select potential answer choices for other digital questions. For example, FIG. 4C illustrates the dynamic choice reference system 104 utilizing operational logic 434 for the second digital question 408 and the response 404, which includes the answer selection from the respondent device 112a and the embedded user data from the respondent device 112a, to select answer choices from the potential answer choices in step 406. Indeed, in one or more embodiments, the dynamic choice reference system 104 utilizes the dynamic choice reference dataset 416 from FIG. 4B to select answer choices for the second digital question in step 406 and generate the second digital question comprising the selected answer choices 414.

In one or more embodiments, the dynamic choice reference system 104 utilizes operational logic associated with a digital question to select answer choices from potential answer choices. For example, as shown in FIG. 4C, the dynamic choice reference system 104 can utilize operational logic 434 associated with the second digital question 408. Indeed, in one or more embodiments, the dynamic choice reference system 104 can utilize the operational logic 434 with information such as the response 404 to select answer choices from potential answer choices. For example, the dynamic choice reference system 104 can utilize operational logic such as filters that comprise of at least one of AND, OR, and NOT operators (i.e., conjunctions, disjunctions, and/or negations). Furthermore, in one or more embodiments, the dynamic choice reference system 104 utilizes operational logic such as, but not limited to, preferences or overrides provided by an administrator device 108 and/or Boolean logic such as, but not limited to, unions, intersections, and/or subsets. Additionally, in some embodiments, the dynamic choice reference system 104 utilizes operational logic such as mathematical functions.

Indeed, in some embodiments, the dynamic choice reference system 104 utilizes operational logic to select answer choices for a digital question from potential answer choices based on response tags received from a respondent device. In particular, the dynamic choice reference system 104 can utilize operational logic to filter potential answer choices by referencing a dynamic choice reference dataset. In some embodiments, the dynamic choice reference system 104 utilizes operational logic comprising instructions to select answer choices from potential answer choices that are associated with a response tag provided in a response from a respondent device. For example, referring to FIGS. 4B and 4C, the dynamic choice reference system 104 can utilize operational logic 434 comprising instructions to select potential answer choices based on the provided response in response 404 by identifying potential answer choices 418 from the dynamic choice reference dataset 416 that are associated with a dynamic choice tag 420 of "1" because the answer choice in response 404 comprises the response tag "1." Indeed, referring to FIGS. 4B and 4C, the dynamic choice reference system 104 can select the answer choices "pepperoni pizza," "breadsticks," "buffalo wings," "mushroom pizza," "gelato," and "grissini" based on the tag "1" in response 404.

Additionally, in one or more embodiments, the dynamic choice reference system 104 utilizes operational logic to select answer choices from potential answer choices based on both embedded user data and response tags. In particular, in some embodiments, the dynamic choice reference system 104 utilizes operational logic comprising instructions to select answer choices for a digital question from potential answer choices that are associated with a tag provided in a response from the respondent device and that are also associated with certain embedded user data. For instance, referring to FIGS. 4B and 4C, the dynamic choice reference system 104 can utilize operational logic 434 comprising instructions to select potential answer choices based the provided tag in response 404 (i.e., the response tag of "1") and a country code association of either "US" or "ALL." Indeed, referring to FIGS. 4B and 4C, the dynamic choice reference system 104 can select the answer choices "pepperoni pizza," "breadsticks," "buffalo wings," and "mushroom pizza" based on the tag "1" in response 404 and a country code of either "US" or "ALL." Furthermore, referring to FIGS. 4B and 4C, the dynamic choice reference system 104 can avoid selecting the answer choice of "gelato" because the answer choice of "gelato" is not associated with a country code of either "US" or "ALL."

Furthermore, in one or more embodiments, the dynamic choice reference system 104 utilizes operational logic comprising instructions such as overrides and/or preferences from an administrator device 108 to select answer choices from potential answer choices. In particular, the dynamic choice reference system 104 can utilize operational logic that comprises instructions from an administrator device 108 to include and/or exclude certain potential answer choices. Furthermore, the dynamic choice reference system 104 can utilize operational logic that comprises preferences such as the number of selections, override instructions to prevent a selection of specific answer choices regardless of other operational logic, and/or override instructions to include specific answer choices regardless of other operational logic.

For example, referring to FIGS. 4B and 4C, the dynamic choice reference system 104 can receive operational logic 434 for the second digital question from the administrator device 108 that comprises instructions to select from potential answer choices 418 from the dynamic choice reference dataset 416 that are associated with the dynamic choice tag of "1" and comprise further instruction to not select the potential answer choice "pepperoni pizza." Indeed, referring to FIGS. 4B and 4C, the dynamic choice reference system 104 can select the answer choices of "breadsticks," "buffalo wings," "mushroom pizza," "gelato," and "grissini" based on the operational logic described above. Additionally, referring to FIGS. 4B and 4C, the dynamic choice reference system 104 can receive operational logic 434 for the second digital question from the administrator device 108 that comprises instructions to include the "Text Answer Format" option in addition to any other selected answer choices. As a result, the dynamic choice reference system 104 can include a text box for a text response with other selected answer choices from the potential answer choices (i.e., a set of multiple choice answer choices and an option to provide a text response).

Furthermore, as just mentioned, the dynamic choice reference system 104 can utilize operational logic that comprises preferences such as the number of selections to select. For example, the dynamic choice reference system 104 can receive operational logic for a digital question from the administrator device 108 that comprises instructions to only select a certain number of answer choices (e.g., three answer choices) from potential answers associated with a response tag that is provided in a response by a respondent device. Moreover, in one or more embodiments, the dynamic choice reference system 104 also receives operational logic for a digital question from the administrator device 108 that comprises instructions to only select a certain number of answer choices from potential answer choices associated with a response tag that is provided in a response by a respondent device based on ranks associated with the potential answer choices. For instance, referring to FIGS. 4B and 4C, based on operational logic 434 comprising instructions to only select the top three ranked answer choices from potential answer choices 418 associated with a dynamic choice tag 420 that matches the response tag in response 404, the dynamic choice reference system 104 can select the answer choices "pepperoni pizza," "breadsticks," "buffalo wings," "mushroom pizza," "gelato," and "grissini" and then utilize the ranks 432 associated with the potential answer choices to identify "pepperoni pizza," "breadsticks," and "mushroom pizza" as the top three answer choices (i.e., the potential answer choices with the lowest rank values).

In addition to the rank 432 from the dynamic choice reference dataset 416 illustrated in FIG. 4B, the dynamic choice reference system 104 can utilize any other method to rank, order, and/or weigh potential answer choices to select a limited number of answer choices. For instance, in one or more embodiments, the dynamic choice reference system 104 receives a dynamic choice reference dataset in a specific order from the administrator device 108 and can select the first potential answer choices that satisfy instructions provided in operational logic for a digital question. Furthermore, the dynamic choice reference system 104 can provide a weight to potential answer choices based on other factors such as, but not limited to, a popularity of a potential answer choice (i.e., a frequency of selection from respondent devices of each potential answer choice), votes provided for each potential answer choice from administrator device 108 and/or respondent devices 112, and popularity of a potential answer choice to specific demographics based on embedded user data.

Additionally, in one or more embodiments, the dynamic choice reference system 104 can utilize operational logic comprising instructions from an administrator device 108 with preferences for a course of action when there are not enough potential answer choices to select based on the provided operational logic. For example, in some embodiments, the dynamic choice reference system 104 utilizes operational logic comprising instructions to select a text format as the selected answer choice when there are not enough potential answer choices to select based on the provided operational logic. Furthermore, in one or more embodiments, the dynamic choice reference system 104 utilizes a secondary set of operational logic provided by the administrator device 108 when the first set of operational logic results in an insufficient number of selections from potential answer choices. In some embodiments, the dynamic choice reference system 104 receives a value from the administrator device 108 for the minimum number required selections.

In one or more embodiments, the dynamic choice reference system 104 also utilizes operational logic comprising instructions to select answer choices for a fixed amount of times based on a quota. For example, in some embodiments, the dynamic choice reference system 104 receives a quota value for each potential answer choice from an administrator device 108. Furthermore, the dynamic choice reference system 104 can utilize operational logic comprising instructions to select answer choices until the potential answer choice is selected the number of times provided in a quota associated with the potential answer choice. For instance, referring to FIGS. 4B and 4C, the dynamic choice reference system 104 can receive a quota value of one hundred for the potential answer choice 418 of "pepperoni pizza" in the dynamic choice reference dataset 416 and cease to select the answer choice of "pepperoni pizza" after selecting the answer choice one hundred times.

Furthermore, the dynamic choice reference system 104 can also utilize operational logic comprising instructions to select answer choices from determined subsets of potential answer choices. For instance, in one or more embodiments, the dynamic choice reference system 104 can utilize operational logic comprising instructions to select answer choices from subsets of potential answer choices by updating a subset of previously selected answer choices with potential answer choices that have already been selected previous digital questions. Additionally, the dynamic choice reference system 104 can utilize operational logic comprising instructions to select answer choices from potential answer choices that are not in the subset of previously selected answer choices.

Additionally, the dynamic choice reference system 104 can also utilize operational logic comprising instructions to select answer choices from more than one sets of potential answer choices to select answer choices. For instance, the dynamic choice reference system 104 can utilize operational logic comprising instructions to select answer choices from different sets of potential answer choices to select answer choices by corresponding responses to different sets of potential answer choices. For example, in one or more embodiments, the dynamic choice reference system 104 can utilize multiple sets of potential answer choices that correspond to different groups. Indeed, the dynamic choice reference system 104 can also associate responses with different sets of potential answer choices and utilize operational logic comprising instructions to select answer choices from different sets of potential answer choices based on a group, tag, and/or other information corresponding to a response.

Moreover, the dynamic choice reference system 104 can also select answer choices from potential answer choices that are associated with more than one element in an information field. Indeed, the dynamic choice reference system 104 can generate a dynamic choice reference dataset that comprises a potential answer choice that is associated with more than one element in a single information field. For example, as shown in FIG. 4B, the dynamic choice reference dataset 416 includes potential answer choices that are associated with more than one element in a single information field. For instance, as shown in FIG. 4B, the dynamic choice reference dataset 416 includes the potential answer choice 418 of "buffalo wings" which is associated with both dynamic choice tags of "1" and "3." Indeed, the dynamic choice reference system 104 can select a potential answer choice when operational logic associated with a digital question comprises instructions to select a potential answer choice when either element is present in an information field. For example, referring to FIGS. 4B and 4C, the dynamic choice reference system 104 can select the potential answer choice 418 of "buffalo wings" when the operational logic 434 comprises instructions to select a potential answer choice when either, exclusively or non-exclusively, the dynamic choice tag of "1" or the dynamic choice tag of "3" is present.

In one or more embodiments, the dynamic choice reference system 104 also utilizes more than one response to select answer choices from potential answer choices for a digital question. For example, in some embodiments, the dynamic choice reference system 104 utilizes operational logic comprising instructions that select answer choices based on more than one response. For instance, the dynamic choice reference system 104 can utilize operational logic comprising instructions to select answer choices for a digital question based on response tags received from multiple responses of a respondent device for two or more digital questions. Indeed, referring to FIG. 4B, the dynamic choice reference system 104 can receive a response tag of "2" for a digital question and a response tag of "3" for another digital question and utilize the operational logic described above to select the potential answer choices 418 of "fish taco," "fries," "buffalo wings," "cheese burger," and "gelato" based on the received response tags "2" and "3" from a respondent device. Additionally, in some embodiments, the dynamic choice reference system 104 utilizes operational logic comprising instructions to select answer choices from potential answer choices based on an aggregate of responses from multiple respondent devices. For example, an aggregate of responses can include information such as, but not limited to, the least selected answer choices from respondent devices, the most selected answer choices from respondent devices, and/or answer choices that have not been selected from respondent devices.

Furthermore, the dynamic choice reference system 104 can utilize operational logic and a response from a respondent device comprising an answer selection to a digital question and/or embedded user data to select answer choices from potential answer choices for another digital question. Indeed, as shown in FIG. 4C, the dynamic choice reference system 104 can utilize the operational logic 434 and the response 404 to select answer choices from potential answer choices in 406 for the second digital question 408. For instance, the operational logic 434 may comprise instructions to select answer choices based on the response tag in response 404 and where potential answer choices match the country code from the embedded user data of the respondent device 112*a*. Furthermore, the dynamic choice reference system 104 can utilize the operational logic 434 and the response 404 to select answer choices from potential answer choices in 406 by accessing the dynamic choice reference dataset 416 described in FIG. 4B. For instance, the dynamic choice reference system 104, as shown in FIG. 4C, selects answer choices "pepperoni pizza," "mushroom pizza," and "breadsticks" to generate digital question 414 from the dynamic choice reference dataset 416 based on the operational logic 434 when the response 404 includes a response tag of "1" and when the embedded user data in response 404 comprises the country code of "US."

As mentioned above, the embodiment in FIGS. 4A-4C is an exemplary embodiment to describe features of the dynamic choice reference system 104 and does not limit the dynamic choice reference system 104 to the example in FIGS. 4A-4C. Indeed, the dynamic choice reference system 104 can utilize any number and/or combination of digital questions and any number and/or combination of potential answer choices from any subject. Furthermore, the dynamic choice reference system 104 can generate a digital choice reference dataset with any number and/or combination of potential answer choices from any subject and/or any combination and/or type of information fields. Additionally, dynamic choice reference system 104 can utilize any combination of any operational logic, embedded user data, and/or responses to digital questions to select answer choices from potential answer choices for another digital question. In one or more embodiments, the dynamic choice reference system 104 selects answer choices for any number of digital questions based on a response comprising a multiple choice answer selection from a respondent device with the methods and/or systems described herein.

Figure 5A:
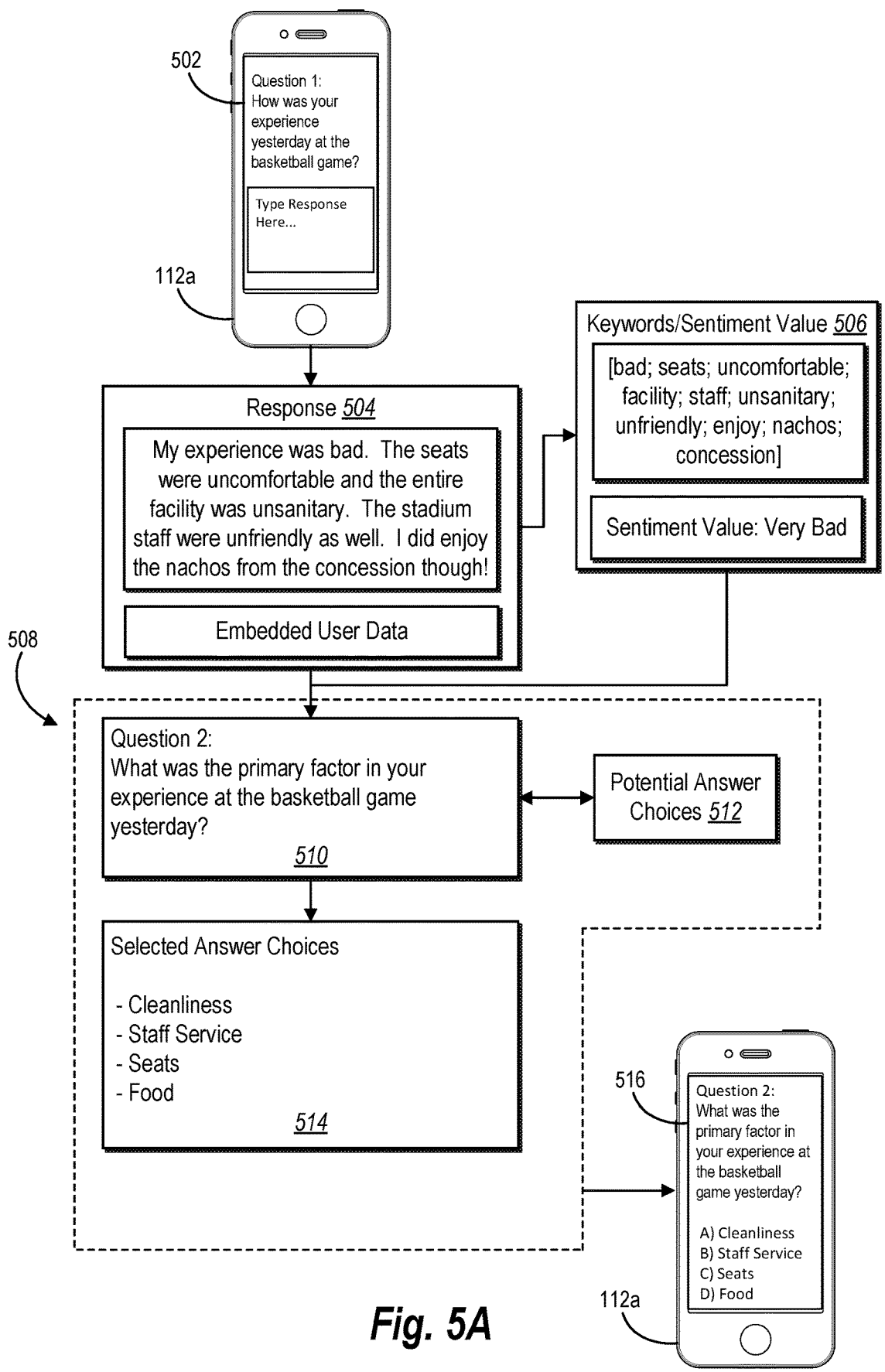
Figure 5C:
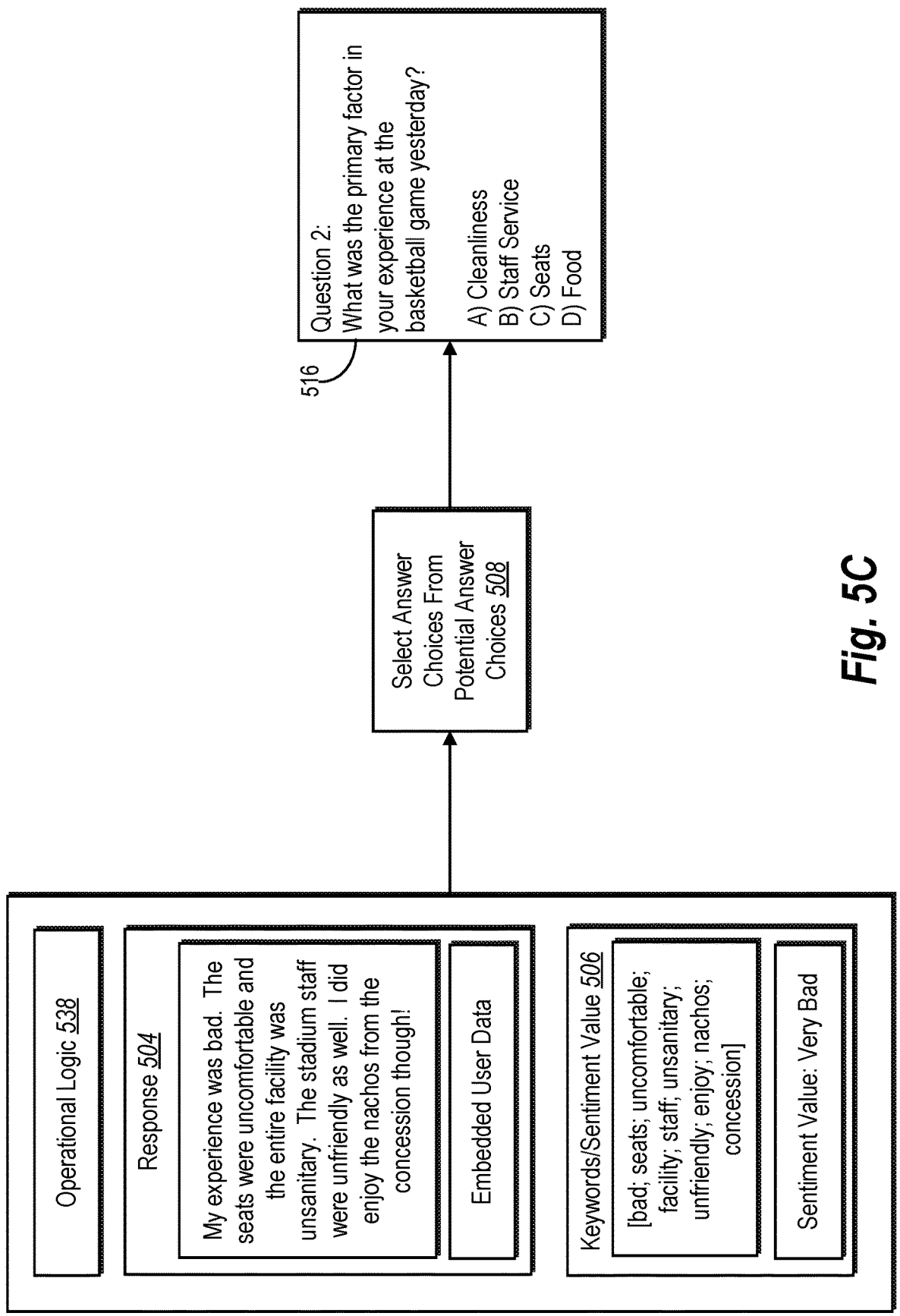

As just mentioned, the dynamic choice reference system 104 can utilize one or more text responses to digital questions from a respondent device to select answer choices from potential answer choices for other digital questions. For instance, as shown in FIGS. 5A-5C, the dynamic choice reference system 104 can select answer choices from potential answer choices for a second digital question based on a received text response by utilizing keywords and/or sentiment values associated with the received text response. For example, FIG. 5A illustrates an overview of the dynamic choice reference system 104 selecting answer choices from potential answer choices for a second digital question based on a received text response. Furthermore, as shown in FIG. 5B, the dynamic choice reference system 104 can access a dynamic choice reference dataset in order to select answer choices from potential answer choices for a second digital question. Additionally, as illustrated in FIG. 5C, the dynamic choice reference system 104 can select answer choices for the second digital question based on operational logic associated with the second digital question, the received text response, keywords and/or sentiment values from the received text response, and/or embedded user data from a respondent device.

In some embodiments, the dynamic choice reference system 104 selects answer choices from potential answer choices for a second digital question based on a text response received from a respondent device. For example, as shown in FIG. 5A, the dynamic choice reference system 104 provides a digital question and a text response box to a respondent device and receives a response comprising a text response and embedded user data from the respondent device. Moreover, as shown in FIG. 5A, the dynamic choice reference system 104 identifies keywords and/or sentiment values from a text response received from a respondent device. Furthermore, FIG. 5A illustrates the dynamic choice reference system 104 utilizing a response comprising a text response and embedded user data and identified keywords and/or sentiment values to select answer choices for another digital question. For example, as illustrated in FIG. 5A, the dynamic choice reference system 104 selects answer choices for a second digital question by accessing the second digital question, which comprises operational logic, and potential answer choices. Additionally, as shown in FIG. 5A, the dynamic choice reference system 104 provides a digital question with selected answer choices from the potential answer choices to a respondent device.

Indeed, the dynamic choice reference system 104 can provide a digital question with a text response box to a respondent device. In particular, as illustrated in FIG. 5A, the dynamic choice reference system 104 provides a digital question with a text response box 502 to a respondent device 112*a*. Indeed, the dynamic choice reference system 104 can provide a digital question with a text response box that is pre-selected as an initial response format in a digital survey. Furthermore, in some embodiments, the dynamic choice reference system 104 provides a digital question with a text response box that is selected by the dynamic choice reference system 104 as an answer format for the digital question by the various approaches described in FIGS. 4-7. Moreover, the dynamic choice reference system 104 may provide instructions to the respondent device 112*a* corresponding to a text response box. For example, as shown in FIG. 5A, text response box 502 provides the instructions "Type Response Here . . . " to the respondent device 112*a*.

Additionally, the dynamic choice reference system 104 can receive a text response to a digital question in a response from a respondent device. For example, as shown in FIG. 5A, the dynamic choice reference system 104 receives a response 504 from the respondent device 112*a*. Indeed, in one or more embodiments, the dynamic choice reference system 104 can receive a response comprising text input from the respondent device 112*a*. For instance, as shown in FIG. 5A, the dynamic choice reference system 104 receives the following text response, "My experience was bad. The seats were uncomfortable and the entire facility was unsanitary. The stadium staff were unfriendly as well. I did enjoy the nachos from the concession stand though!," in response 504 to the provided digital question corresponding to the text response box 502 from the respondent device 112*a*. Furthermore, as shown in FIG. 5A, the dynamic choice reference system 104 also receives embedded user data in response 504 from the respondent device 112*a*. In one or more embodiments, the dynamic choice reference system 104 receives and/or identifies embedded user data as described in FIGS. 3 and 4.

Moreover, the dynamic choice reference system 104 can identify keywords and/or sentiment values from a text response. For instance, as illustrated in FIG. 5A, the dynamic choice reference system 104 identifies keywords and sentiment values 506 from the text response in response 504. In particular, the dynamic choice reference system 104 identifies keywords 506 of "bad; seats; uncomfortable; facility; staff; unsanitary; unfriendly; enjoy; nachos; and concession" from the text response in response 504. Additionally, the dynamic choice reference system 104 identifies the sentiment value 506 of "very bad" from the text response in response 504.

As used herein, the term "keyword" refers to a term that comprises a significant role in content. In particular, the term "keyword" refers to words and/or numbers that comprise a significant role in a sentence. Indeed, the term "keyword" refers to words and/or numbers that signify key concepts in content such as, but not limited to, a passage, a sentence, and/or a paragraph. For example, a keyword can include all terms in content that are not stop words such as "the," "a," and "that." Indeed, keywords can include nouns, adjectives, and verbs that provide context to a sentence.

Furthermore, as used herein, the term "sentiment value" refers to a designation of an opinion, state of mind, and/or an emotional state. More specifically, the term "sentiment value" refers to a score and/or description of an opinion, state of mind, and/or an emotional state represented in content such as, but not limited to, a sentence, a passage, and/or a paragraph. For example, a sentiment value can include a rating such as positive, negative, or neutral. Furthermore, a sentiment value can include an adjective such as "very bad," "bad," "good," and "very good." Additionally, a sentiment value can include emotional states such as "angry," "sad," and "happy."

Indeed, in one or more embodiments, the dynamic choice reference system 104 can analyze text in a text response to identify keywords. For example, the dynamic choice reference system 104 can utilize a variety of approaches to analyze and identify keywords from text. For instance, in one or more embodiments, the dynamic choice reference system 104 detects and removes stop words and/or punctuation to retrieve the remaining words in a text response as keywords. Furthermore, the dynamic choice reference system 104 can utilize approaches such as terminology extraction to extract keywords from a text response. Moreover, in some embodiments, the dynamic choice reference system 104 can utilize each word in a text response as a keyword.

Additionally, in some embodiments, the dynamic choice reference system 104 can analyze text in a text response to determine sentiment value. For instance, the dynamic choice reference system 104 can utilize a variety of approaches to analyze and determine sentiment values from text. For example, in some embodiments, the dynamic choice reference system 104 can utilize knowledge-based techniques, statistical methods, and/or hybrid approaches for sentiment analysis of text. Additionally, the dynamic choice reference system 104 can utilize a variety of approaches for sentiment analysis to identify a sentiment value for text responses. Indeed, the dynamic choice reference system 104 can utilize sentiment analysis approaches to determine the polarity of a text and/or the emotional state of a text.

Furthermore, the dynamic choice reference system 104 can utilize a response comprising a text response to a digital question and/or embedded user data from a respondent device to select answer choices from potential answer choices for another digital question. In some embodiments, the dynamic choice reference system 104 utilizes keywords and/or sentiment values identified from a text response to select answer choices from potential answer choices for another digital question. For example, as illustrated in FIG. 5A, the dynamic choice reference system 104 utilizes the response 504, the identified keywords and sentiment values 506, a second digital question 510, and the potential answer choices 512 to select answer choices 514 for the second digital question 510 in step 508.

Indeed, as shown in FIG. 5A, the dynamic choice reference system 104 accesses potential answer choices 512 to select answer choices for the second digital question 510 "What was the primary factor in your experience at the basketball game yesterday?" based on the response 504 comprising the text response "My experience bad. The seats were uncomfortable and the entire facility was unsanitary. The stadium staff were unfriendly as well. I did enjoy the nachos from the concession though!" and the embedded user data. Furthermore, as shown in FIG. 5A, the dynamic choice reference system 104 also utilizes the identified keywords and the sentiment value 506 to select answer choices for the second digital question 510. Additionally, as illustrated in FIG. 5A, the dynamic choice reference system 104 selects the answer choices "Cleanliness," "Staff Service," "Seats," and "Food" 514 for the second digital question 510 from the potential answer choices 512 based on the response 504 in step 508.

Furthermore, in some embodiments, the dynamic choice reference system 104 utilizes a dynamic choice reference dataset to represent potential answer choices. Indeed, the dynamic choice reference system 104 can utilize a dynamic choice reference dataset to represent potential answer choices as described in FIG. 5B. Moreover, in one or more embodiments, the dynamic choice reference system 104 accesses potential answer choices to select answer choices for a digital question based on any combination of digital question text responses, keywords, sentiment values, digital question operational logic, and/or embedded user data as described in FIG. 5C.

Additionally, in one or more embodiments, the dynamic choice reference system 104 can provide a digital question with selected answer choices, which are selected based on a text response, to a respondent device. For example, as illustrated in FIG. 5A, the dynamic choice reference system 104 provides the second digital question 516 (with the selected answer choices) to the respondent device 112a. Furthermore, as described above in FIG. 4, the dynamic choice reference system 104 can further receive a response to the digital question 516 comprising the selected answer choices from the respondent device 112a and select answer choices for another digital question in accordance with the various methods described in FIGS. 4-7.

As just mentioned, the dynamic choice reference system 104 can utilize a dynamic choice reference dataset to represent potential answer choices with an association to keywords and/or sentiment values. In one or more embodiments, the dynamic choice reference system 104 can utilize a dynamic choice reference dataset as described in FIG. 4 to represent potential answer choices with an association to keywords and/or sentiment values to select answer choices based on a text response. Indeed, FIG. 5B illustrates an exemplary dynamic choice reference dataset 518 for the dynamic choice reference system 104. As illustrated in FIG. 5B, the dynamic choice reference system 104 generates the exemplary dynamic choice reference dataset 518 to comprise potential answer choices 520 for stadium related concepts because the digital questions of FIG. 5 correspond to stadium and/or stadium service themes.

Furthermore, as described above in FIG. 4, the dynamic choice reference system 104 can generate a dynamic choice reference dataset that includes information fields associated with potential answer choices such as keywords, sentiment values, and/or embedded user data. Indeed, as illustrated in FIG. 5B, the dynamic choice reference system 104 generates dynamic choice reference dataset 518 to include information fields associated with the potential answer choices 520 such as keywords 522, sentiment values 524, dynamic choice tags 526, gender 528, age 530, income 532, operating system 534, and rank 536. For example, as shown in FIG. 5B, the potential answer choice 520 of "cleanliness" is associated with keywords such as "unsanitary" and "trash" and the sentiment value 524 of "very bad." Moreover, as shown in FIG. 5B, the potential answer choice 520 of "cleanliness" is also associated with a dynamic choice tag 526 of "1," all genders 528, all ages 530, all incomes 532, operating systems 534 of "iOS" and "Android," and a rank 536 of "1." Additionally, as illustrated in FIG. 5B, the potential answer choice 520 comprising an answer format of "Text Answer Format" is associated with the sentiment values 524 of "extremely good" and "extremely bad."

Indeed, in one or more embodiments, the dynamic choice reference system 104 can utilize a dynamic choice reference dataset comprising potential answer choices and information fields such as keywords and/or sentiment values to select answer choices for a digital question based on a text response. For example, as illustrated in FIG. 5B and referring to FIG. 5A, the dynamic choice reference system 104 can utilize the associations with information fields 522-536 to select potential answer choices 520 from the dynamic choice reference dataset 518 for the second digital question 510. For instance, the dynamic choice reference system 104 can utilize text responses, embedded user data, and/or operational logic from a digital question to select potential answer choices from a dynamic choice reference dataset as described in FIG. 5C.

As just mentioned, the dynamic choice reference system 104 can utilize text responses, keywords and/or sentiment values, embedded user data, and/or operational logic from a digital question to select potential answer choices for other digital questions. For instance, FIG. 5C illustrates the dynamic choice reference system 104 utilizing operational logic 538 for the second digital question 510, the response 504, which includes the text response from the respondent device 112a and the embedded user data from the respondent device 112a, and the identified keywords and sentiment values 506 to select answer choices from the potential answer choices in step 508. Indeed, in one or more embodiments, the dynamic choice reference system 104 utilizes the dynamic choice reference dataset 518 from FIG. 5B to select answer choices for the second digital question in step 508 and generate the second digital question 516 comprising the selected answer choices.

In one or more embodiments, the dynamic choice reference system 104 utilizes operational logic associated with a digital question to select answer choices from potential answer choices based on a text response. For example, in addition to the various embodiments described in FIG. 4 in which the dynamic choice reference system 104 can utilize operational logic to select answer choices, the dynamic choice reference system 104 can also utilize operational logic with text responses to select answer choices from potential answer choices. More specifically, the dynamic choice reference system 104 can utilize operational logic with keywords and/or sentiment values from text responses to select answer choices from potential answer choices.

Indeed, in one or more embodiments, the dynamic choice reference system 104 utilizes operational logic comprising instructions to select answer choices from potential answer choices that are associated with keywords identified from a text response. Furthermore, the dynamic choice reference system 104 can access a dynamic choice reference dataset which comprises keyword and/or sentiment value associations with potential answer choices to select answer choices for a digital question based on identified keywords from a text response. For example, referring to FIGS. 5B and 5C, the dynamic choice reference system 104 can utilize operational logic 538 comprising instructions to select potential answer choices based on the keywords identified in text response 504. In particular, referring to FIGS. 5B and 5C, the dynamic choice reference system 104 can utilize this operational logic to select answer choices from potential answer choices 520 in the dynamic choice reference dataset 518 that comprise associated keywords 522 equivalent to keywords from the identified keywords and sentiment values 506 of "bad; seats; uncomfortable; facility; staff; unsanitary; unfriendly; enjoy; nachos; and concession." As a result, referring to FIGS. 5B and 5C, the dynamic choice reference system 104 can select potential answer choices 520 of "cleanliness," "food," "noise," "staff service," "seats," and the answer format of "Text Answer Format" as selected answer choices.

Furthermore, the dynamic choice reference system 104 can utilize operational logic comprising instructions to select answer choices from potential answer choices that are associated with sentiment values identified from a text response. Moreover, the dynamic choice reference system 104 can access a dynamic choice reference dataset which comprises keyword and/or sentiment value associations with potential answer choices to select answer choices for a digital question based on identified sentiment values from a text response. For instance, referring to FIGS. 5B and 5C, the dynamic choice reference system 104 can utilize operational logic 538 comprising instructions to select potential answer choices based on the sentiment values identified in text response 504. More specifically, referring to FIGS. 5B and 5C, the dynamic choice reference system 104 can utilize this operational logic to select answer choices from potential answer choices 520 in the dynamic choice reference dataset 518 that comprise associated sentiment values 524 equivalent to sentiment values from the identified keywords and sentiment values 506 of "very bad."

As a result, referring to FIGS. 5B and 5C, the dynamic choice reference system 104 can select the potential answer choices 520 of "cleanliness" and "food" as selected answer choices. Furthermore, the dynamic choice reference system 104 can also comprise operational logic comprising instructions to override answer selections and select a text answer format when a sentiment value of "extremely bad" is identified from a text response. Indeed, as shown in FIG. 5B, the dynamic choice reference system 104 can select the "Text Answer Format" from the potential answer choice 520 associated with a sentiment value of "extremely bad" in the dynamic choice reference dataset 518 when there is operational logic comprising instructions to override answer selections and select a text answer format when a sentiment value of "extremely bad" is identified from a text response.

Additionally, the dynamic choice reference system 104 can utilize any operational logic described in the embodiments herein to select answer choices for a digital question from potential answer choices based on a text response. Indeed, as described in FIG. 4, the dynamic choice reference system 104 can utilize any combination of elements and operational logic to select answer choices based on text responses including, but not limited to, embedded user data, overrides, preferences from an administrator device 108, ranks, secondary operational logic when a first set of operational logic does not result in enough selected answer choices, answer choice quotas, aggregate of text responses, votes on keywords in text responses, and/or more than one informational field in a dynamic choice reference dataset. Furthermore, the dynamic choice reference system 104 can also select answer choices based on multiple text responses and/or an aggregation of text responses. For example, the dynamic choice reference system 104 can utilize keywords and/or sentiment values identified from multiple text responses to select answer choices from potential answer choices.

Indeed, as illustrated in FIG. 5C, the dynamic choice reference system 104 can utilize the operational logic 538 from the second digital question 510, the response 504 which includes embedded user data from a respondent device 112a, and the identified keywords and sentiment values 506 to select answer choices from potential answer choices in step 508 to generate the second digital question 516 (with selected answer choices). For example, referring to FIGS. 5B and 5C, the dynamic choice reference system 104 can utilize operational logic 538 comprising instructions to select answer choices from potential answer choices 520 in the dynamic choice reference dataset 518, as described in FIG. 5B, where the keywords 522 match the identified keywords in the keywords and sentiment values 506 and where the operating system 534 matches the operating system in the embedded user data in response 504. For instance, the dynamic choice reference system 104, as shown in FIG. 5C, selects answer choices "cleanliness," "staff service," "seats," and "food" and excludes the answer choice of "noise" from the dynamic choice reference dataset 518 to generate digital question 516 based on the operational logic 538 when the response 404 includes embedded user data comprising an operating system of "iOS" and the keywords from the identified keywords and sentiment values 506.

Moreover, the embodiment in FIGS. 5A-5C is an exemplary embodiment to describe features of the dynamic choice reference system 104 and does not limit the dynamic choice reference system 104 to the example in FIGS. 5A-5C. Indeed, the dynamic choice reference system 104 can utilize any number and/or combination of digital questions and any number and/or combination of potential answer choices from any subject. Furthermore, the dynamic choice reference system 104 can generate a digital choice reference dataset with any number and/or combination of potential answer choices from any subject and/or any combination and/or type of information fields. Additionally, dynamic choice reference system 104 can utilize any combination of any operational logic, embedded user data, and/or responses to digital questions, including text responses, to select answer choices from potential answer choices for another digital question. In one or more embodiments, the dynamic choice reference system 104 selects answer choices for any number of digital questions based on a text response with the embodiments described herein.

As mentioned above, the dynamic choice reference system 104 can also utilize a machine-learning model with one or more responses received from a respondent device to select answer choices from potential answer choices for other digital questions. As used herein, the term "machine-learning model" refers to a model trained to approximate unknown functions based on training input. In particular, in some embodiments, the term "machine-learning model" can include an artificial-neural-network model of interconnected artificial neurons that communicate and learn to approximate complex functions and generate outputs based on inputs provided to the model.

Figure 6:
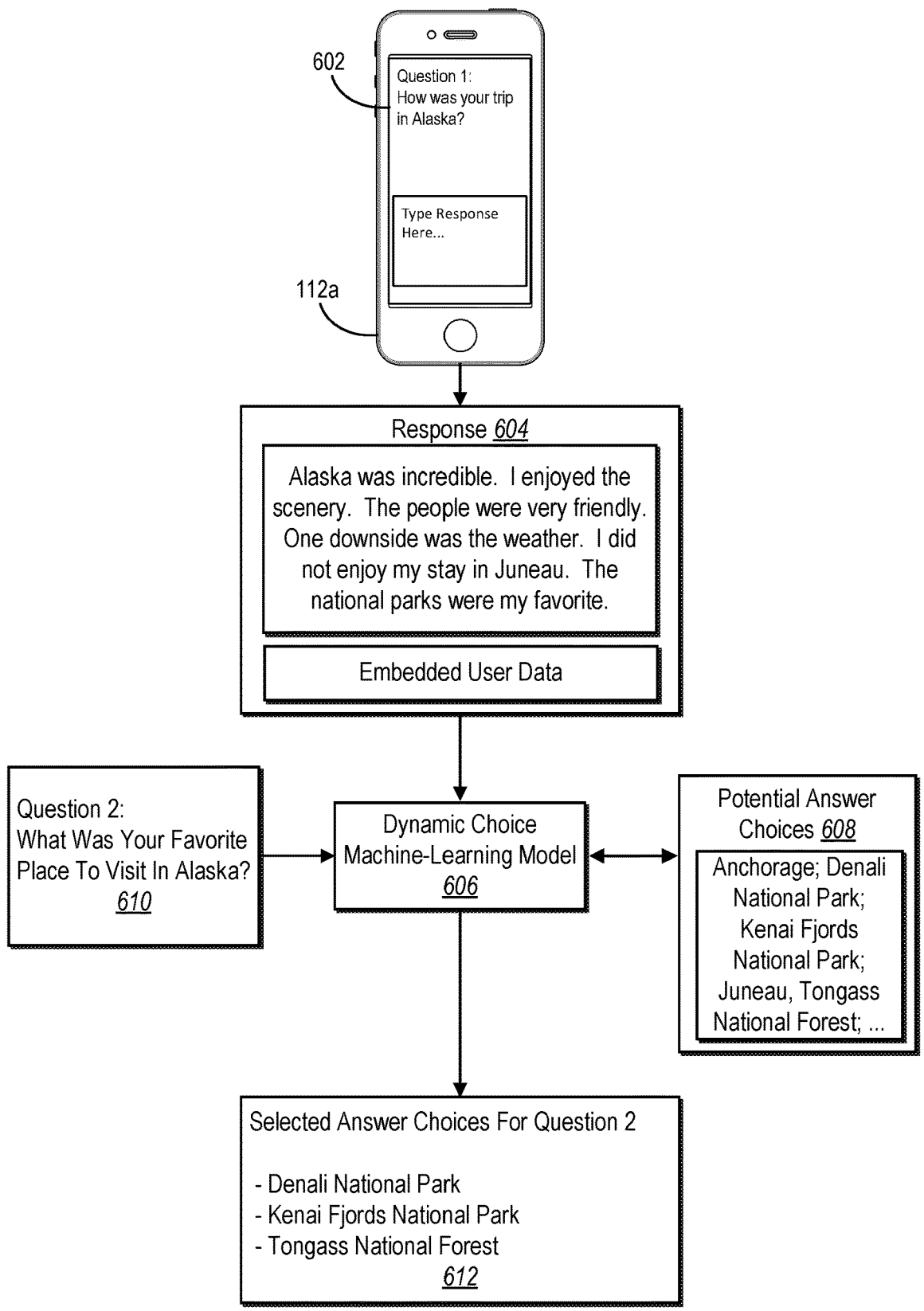
FIG. 6 illustrates a flow chart of utilizing a machine-learning model to select answer choices from potential answer choices for a digital question based on a response.

For instance, FIG. 6 illustrates the dynamic choice reference system 104 utilizing a dynamic choice machine-learning model with a response received from a respondent device to select answer choices from potential answer choices for a digital question. As used herein, the term "dynamic choice machine-learning model" refers to a machine-learning model trained to select one or more answer choices from potential answer choices for a digital question. In particular, in some embodiments, a "dynamic choice machine-learning model" includes a machine-learning model trained to select one or more answer choices from potential answer choices for a digital question based on a response to another digital question from a respondent device and/or embedded user data for a respondent. For instance, a dynamic choice machine-learning model may include, but is not limited to, the following machine-learning models as a basis for training: a convolutional neural network, a feedforward neural network, a fully convolutional neural network, a linear least squared regression, a logistic regression, a Naïve Bayes Support Vector Machine ("NBSVM"), a recurrent neural network ("RNN"), a recursive neural network ("RCNN"), or a support vector regression. Additionally, or alternatively, in certain embodiments, the dynamic choice machine-learning model includes unsupervised learning models, including, but not limited to, Autoencoders, Deep Belief Nets, Hierarchical Clustering, or k-means clustering.

In one or more embodiments, the dynamic choice reference system 104 provides a response received from a respondent device for a digital question to a dynamic choice machine-learning model as input. Furthermore, the dynamic choice reference system 104 can also provide a dynamic choice machine-learning model a second digital question, embedded user data, and/or potential answer choices as input. Indeed, the dynamic choice reference system 104 can utilize a dynamic choice machine-learning model to select one or more answer choices and/or answer formats for a second digital question based on the input provided by the dynamic choice reference system 104 (i.e., input such as the response which may include an answer choice or text response and embedded user data, the second digital question, and/or potential answer choices).

Additionally, in some embodiments, the dynamic choice reference system 104 provides a response to a digital question from a respondent device to a dynamic choice machine-learning model. For instance, in one or more embodiments, the dynamic choice reference system provides a response as described in the various embodiments of FIGS. 2-5 to a dynamic choice machine-learning model. Additionally, the response can comprise a text response and/or an answer choice selection from multiple choice answer choices. Furthermore, the dynamic choice reference system 104 can also provide embedded user data to a dynamic choice machine-learning model as described in the various embodiments of FIGS. 2-5.

Moreover, the dynamic choice reference system 104 can also provide a second digital question, for which a dynamic choice machine-learning model will select answer choices, to the dynamic choice machine-learning model. For instance, the second digital question can comprise operational logic and other elements as described in the various embodiments of FIGS. 2-5. Additionally, in some embodiments, the dynamic choice reference system 104 can utilize the dynamic choice machine-learning model to select answer choices for a second digital question without providing the dynamic choice machine-learning model with a digital question. For instance, the dynamic choice machine-learning model can be trained to select answer choices for a specific digital question and/or trained to select answer choices for a variety of digital questions by inputting the digital question into the dynamic choice machine-learning model.

Furthermore, the dynamic choice reference system 104 can also provide a dynamic choice machine-learning model with potential answer choices. For instance, the dynamic choice reference system 104 can provide potential answer choices in various formats to the dynamic choice machine-learning model. Indeed, the dynamic choice reference system 104 can provide potential answer choices to a dynamic choice machine-learning model as a list of potential answer choices. In some embodiments, the dynamic choice reference system 104 can also provide a dynamic choice reference dataset as described in FIGS. 4 and 5 to the dynamic choice machine-learning model.

Additionally, the dynamic choice reference system 104 can utilize a dynamic choice machine-learning model with provided input such as, but not limited to, a response from a respondent device, embedded user data, one or more digital questions, and/or potential answer choices to select answer choices from potential answer choices for a digital question. For example, the dynamic choice reference system 104 can utilize the dynamic choice machine-learning model to analyze a response and access a potential answer choice list to select answer choices for a digital question based on information obtained from the analyzed response. Additionally, the dynamic choice reference system 104 can also utilize the dynamic choice machine-learning model to analyze embedded user data and access a potential answer choice list to select answer choices for another digital question based on the analyzed embedded user data.

Moreover, in one or more embodiments, the dynamic choice reference system 104 utilizes a dynamic choice machine-learning model to select answer choices for a digital question based on a text response. For example, in some embodiments, the dynamic choice reference system 104 utilizes a dynamic choice machine-learning model to analyze a text response and access a potential answer choice list to select answer choices for a digital question based on the analyzed text response.

For example, FIG. 6 illustrates the dynamic choice reference system 104 utilizing a dynamic choice machine-learning model 606 to select answer choices for a digital question 610. Indeed, as shown in FIG. 6, the dynamic choice reference system 104 provides a response 604 for a digital question 602 from respondent device 112a to the dynamic choice machine-learning model 606. For instance, as illustrated in FIG. 6, the digital question 602 can be the digital question "How was your trip in Alaska?" Furthermore, as shown in FIG. 6, the response 604 includes text input from respondent device 112a as a text response "Alaska was incredible. I enjoyed the scenery. The people were very friendly. One downside was the weather. I did not enjoy my stay in Juneau. The national parks were my favorite." and embedded user data from the respondent device 112a. Additionally, as shown in FIG. 6, the dynamic choice reference system 104 also provides a second digital question 610 "What was your favorite place to visit in Alaska?" Furthermore, as illustrated in FIG. 6, the dynamic choice reference system 104 also provides potential answer choices 608 comprising various locations in Alaska to the dynamic choice machine-learning model 606.

Moreover, after the dynamic choice reference system 104 provides the response 604, the potential answer choices 608, and the second digital question 610 to the dynamic choice machine-learning model 606, the dynamic choice reference system 104 can utilize the dynamic choice machine-learning model 606 to select answer choices for the second digital question 610. Indeed, as shown in FIG. 6, the dynamic choice machine-learning model 606 outputs the selected answer choices 612 "Denali National Park," "Kenai Fjords National Park," and "Tongass National Forest." For instance, in one or more embodiments, the dynamic choice machine-learning model 606 can analyze the text response in response 604 to determine that the respondent 116a on respondent device 112a is interested in national parks and not cities. Furthermore, based on this determination, the dynamic choice machine-learning model 606 can select national parks and/or other nature related options from the potential answer choices 608 and can avoid cities from the potential answer choices 608.

The embodiment in FIG. 6 is an exemplary embodiment to describe features of the dynamic choice reference system 104 and does not limit the dynamic choice reference system 104 to the example in FIG. 6. Indeed, the dynamic choice reference system 104 can utilize any number and/or combination of digital questions and any number and/or combination of potential answer choices from any subject. Additionally, dynamic choice reference system 104 can utilize any combination of any operational logic, embedded user data, and/or responses to digital questions, including text responses, to select answer choices from potential answer choices for another digital question by utilizing a machine-learning model. In one or more embodiments, the dynamic choice reference system 104 selects answer choices for any number of digital questions by utilizing a machine-learning model.

Figure 7:
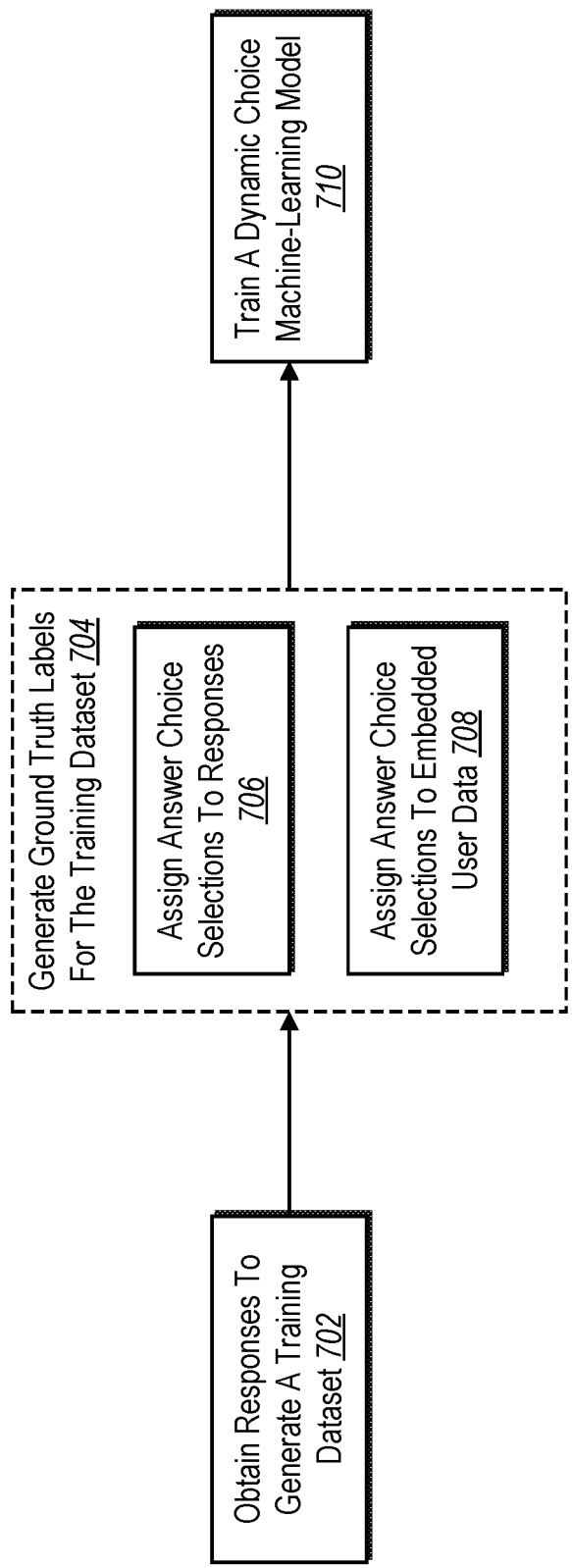
FIG. 7 illustrates a flow chart of training a machine-learning model to select answer choices from potential answer choices for a digital question based on a response.

As just mentioned, the dynamic choice reference system 104 can train a machine-learning model to select answer choices from potential answer choices for a digital question. Indeed, the dynamic choice reference system 104 can obtain responses to generate a training dataset, generate ground truth labels for the training dataset, and utilize the ground truth labels to train the machine-learning model to select answer choices for a digital question based on a response. For instance, FIG. 7 illustrates the dynamic choice reference system 104 training a machine-learning model to select answer choices from potential answer choices for a digital question. For example, as shown in FIG. 7, the dynamic choice reference system 104 performs an act 702 of obtaining responses to generate a training dataset, an act 704 of generating ground truth labels for the training dataset, and an act 710 of training a dynamic choice machine-learning model.

In one or more embodiments, the dynamic choice reference system 104 can obtain responses to generate a training dataset. For example, FIG. 7 illustrates the dynamic choice reference system 104 performing an act 702 of obtaining responses to generate a training dataset. Moreover, in one or more embodiments, the dynamic choice reference system 104 can obtain one or more responses from one or more respondent devices and/or an administrator device 108. In some embodiments, the dynamic choice reference system 104 can obtain text responses as the responses. Furthermore, the dynamic choice reference system 104 can group one or more responses to be associated with a digital question. Indeed, the dynamic choice reference system 104 can generate a training dataset by grouping one or more responses to a digital question. Additionally, the dynamic choice reference system 104 can also obtain embedded user data as part of a response. Indeed, in some embodiments, the dynamic choice reference system 104 can generate a training dataset by grouping one or more responses, which include a text response and embedded user data, to a digital question.

Furthermore, the dynamic choice reference system 104 can generate ground truth labels for a training dataset of responses. Indeed, as shown in FIG. 7, the dynamic choice reference system 104 can perform an act 704 of generating ground truth labels for the training dataset. For example, the dynamic choice reference system 104 can generate ground truth labels for a training dataset of responses by utilizing answer choice selections from potential answer choices, the responses in a training dataset, and/or the embedded user data in the training dataset. As used herein, the term "ground truth label" refers to a known set of information that is associated with a training dataset that can be utilized by comparing the known set of information with predictions from a machine learning model based on the same training dataset for accuracy. For example, ground truth labels can include known associations between responses in the training dataset with answer choice selections from potential answer choices. Furthermore, ground truth labels can also include known associations between embedded user data in the training dataset with answer choice selections from potential answer choices.

Indeed, the dynamic choice reference system 104 can generate ground truth labels by assigning answer choice selections to responses from a training dataset. For instance, as shown in FIG. 7, the dynamic choice reference system 104 can perform an act 706 of assigning answer choice selections to responses from a training dataset. For example, in one or more embodiments, the dynamic choice reference system 104 can assign answer choice selections from potential answer choices to one or more text responses from a training dataset. Indeed, the dynamic choice reference system 104 can utilize assigned answer choice selections to text responses from a training dataset as ground truth answer choice labels. Furthermore, the dynamic choice reference system 104 can obtain assignments of answer choice selections to responses from a training dataset from one or more respondent devices 112 and/or an administrator device 108.

Additionally, the dynamic choice reference system 104 can also generate ground truth labels by assigning answer choice selections to embedded user data from a training dataset. For example, as shown in FIG. 7, the dynamic choice reference system 104 can perform an act 708 of assigning answer choice selections to embedded user data from a training dataset. For instance, in some embodiments, the dynamic choice reference system 104 can assign answer choice selections from potential answer choices to one or more embedded user data elements from a training dataset. Indeed, the dynamic choice reference system 104 can utilize assigned answer choice selections to embedded user data from a training dataset as ground truth answer choice labels. Moreover, the dynamic choice reference system 104 can obtain assignments of answer choice selections to embedded user data from a training dataset from one or more respondent devices 112 and/or an administrator device 108. In some embodiments, the dynamic choice reference system 104 can assign answer choice selections to a combination of one or more responses and/or one or more embedded user data elements to generate ground truth answer choice labels for a training dataset.

Furthermore, the dynamic choice reference system 104 can train a machine-learning model to select answer choices from potential answer choices for a digital question based on a response from a respondent device. For instance, as shown in FIG. 7, the dynamic choice reference system 104 can perform an act 710 of training a dynamic choice machine-learning model. Indeed, the dynamic choice reference system 104 can provide the training dataset to a dynamic choice machine-learning model, receive predicted answer choice selections for a digital question from the dynamic choice machine-learning model, compare the predicted answer choice selections to the ground truth labels generated by the dynamic choice reference system 104 to generate a calculated loss, and utilize the calculated loss to configure the dynamic choice machine-learning model.

As just mentioned, in one or more embodiments, the dynamic choice reference system 104 provides the training dataset comprising responses to a dynamic choice machine-learning model. For instance, in some embodiments, the dynamic choice reference system 104 provides a training dataset comprising text responses to a dynamic choice machine-learning model. Additionally, the dynamic choice reference system 104 can provide a training dataset comprising text responses and embedded user data to a dynamic choice machine-learning model. Furthermore, the dynamic choice reference system 104 can provide other input to a dynamic choice machine-learning model such as a digital question and potential answer choices.

Indeed, in one or more embodiments, the dynamic choice reference system 104 utilizes the dynamic choice machine-learning model with input to predict answer choice selections for a digital question based on responses. For example, the dynamic choice reference system 104 can utilize the dynamic choice machine-learning model to predict answer choice selections for a digital question for each input response and/or embedded user data element from a training dataset. Moreover, the dynamic choice reference system 104 can utilize the dynamic choice machine-learning model to predict answer choice selections as described in the various approaches in FIG. 6.

Additionally, the dynamic choice reference system 104 can calculate a calculated loss by comparing the predicted answer choice selections for the training dataset from the dynamic choice machine-learning model with ground truth labels. For instance, in one or more embodiments, the dynamic choice reference system 104 can compare ground truth answer choice labels which comprise answer choice selection labels that correspond to a response in a training dataset with predicted answer choice selections from a dynamic choice machine-learning model for the response from the training dataset to calculate a calculated loss. Furthermore, in some embodiments, the dynamic choice reference system 104 can compare ground truth answer choice labels which comprise answer choice selection labels that correspond to embedded user data in a training dataset with predicted answer choice selections from a dynamic choice machine-learning model for the embedded user data elements from the training dataset to calculate a calculated loss. Moreover, the dynamic choice reference system 104 can also compare ground truth answer choice labels corresponding to any combination of one or more responses and/or one or more embedded user data elements with predicted answer choice selections from a dynamic choice machine-learning model for the same combination of one or more responses and/or one or more embedded user data elements to calculate a calculated loss.

In addition to calculating a calculated loss, the dynamic choice reference system 104 can also utilize the calculated loss to train the dynamic choice machine-learning model. Indeed, in one or more embodiments, the dynamic choice reference system 104 can provide a calculated loss to a dynamic choice machine-learning model to adjust parameters in the dynamic choice machine-learning model. Furthermore, the dynamic choice reference system 104 can utilize the dynamic choice machine-learning model to predict answer selections for a training dataset after providing the dynamic choice machine-learning model with a calculated loss and adjusting parameters of the dynamic choice machine-learning model. Additionally, the dynamic choice reference system 104 can repetitively calculate a calculated loss and provide the calculated loss to the dynamic choice machine-learning model until the dynamic choice machine-learning model can accurately select answer choice selections for the training dataset. Indeed, in one or more embodiments, the dynamic choice reference system 104 can utilize the calculated loss to determine the accuracy of the dynamic choice machine-learning model.

Each of the components of the dynamic choice reference system 104 can include software, hardware, or both. For example, the dynamic choice reference system 104 can include one or more instructions stored on a computer-readable storage medium and executable by processors of one or more computing devices, such as a client device or server device. When executed by the one or more processors, the computer-executable instructions of the dynamic choice reference system 104 can cause the computing device(s) to perform the actions, processes, and methods described herein. Alternatively, the dynamic choice reference system 104 can include hardware, such as a special-purpose processing device to perform a certain function or group of functions. Alternatively, the dynamic choice reference system 104 can include a combination of computer-executable instructions and hardware.

Furthermore, the dynamic choice reference system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the dynamic choice reference system 104 may be implemented as a stand-alone application, such as a desktop or mobile application. Furthermore, the dynamic choice reference system 104 may be implemented as one or more web-based applications hosted on a remote server. The dynamic choice reference system 104 may also be implemented in a suite of mobile device applications or "apps." To illustrate, the dynamic choice reference system 104 may be implemented in a software application, including but not limited to QUALTRICS® EMPLOYEE EXPERIENCE®, QUALTRICS® EXPERIENCE MGMT®, QUALTRICS® EXPERIENCE MANAGEMENT PLATFORM®, QUALTRICS® SURVEYS, QUALTRICS® INSIGHT PLATFORM®, or QUALTRICS® FOLLOW UP. "QUALTRICS," "EMPLOYEE EXPERIENCE," "EXPERIENCE MGMT," "EXPERIENCE MANAGEMENT PLATFORM," and "INSIGHT PLATFORM" are either registered trademarks or trademarks of Qualtrics, LLC or Qualtrics Labs, Inc. in the United States and/or other countries.

Figure 8:
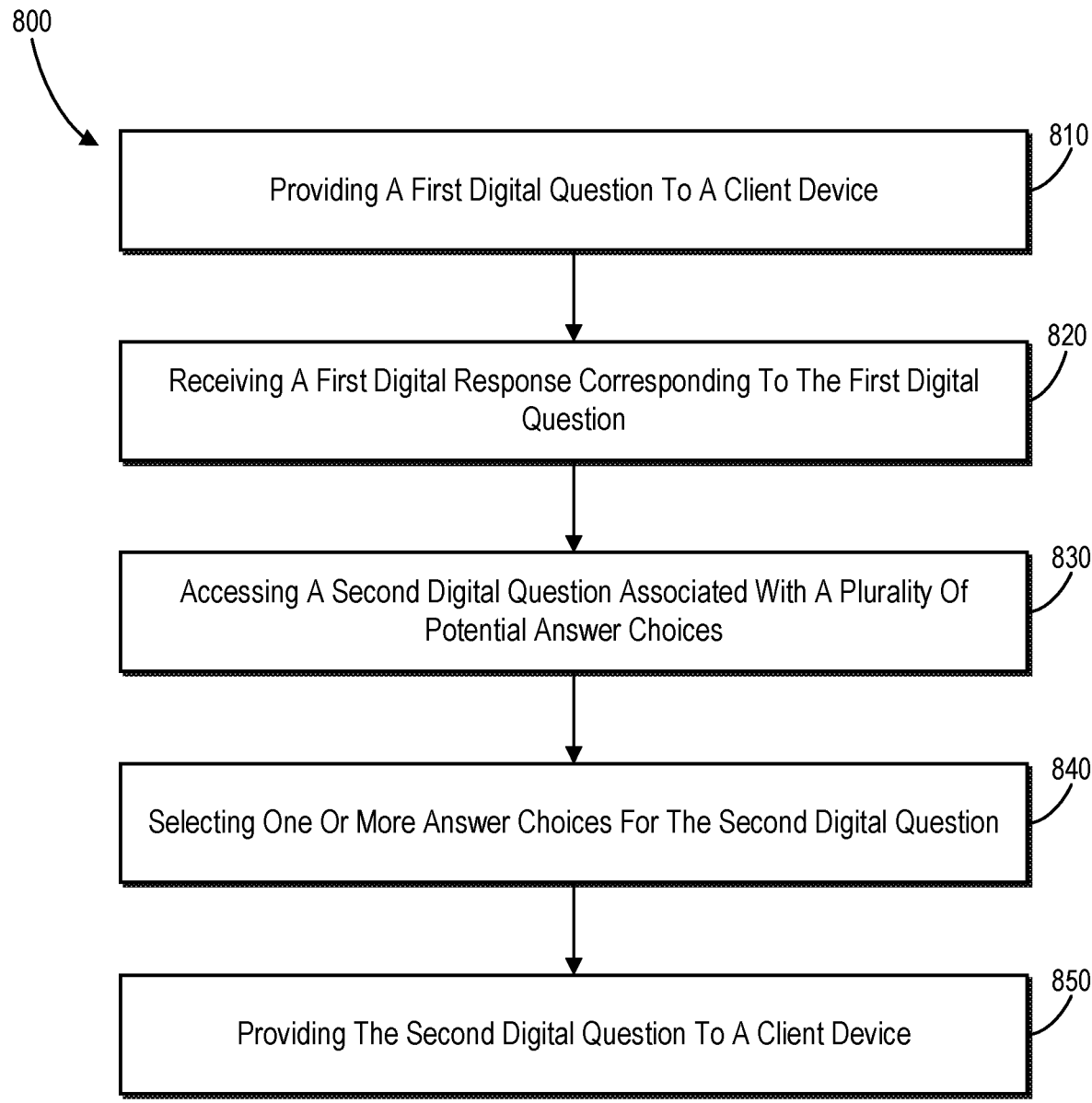
FIG. 8 illustrates a flow chart of a series of acts for selecting answer choices from potential answer choices for a digital question based on a response to another digital question in accordance with one or more embodiments.

Turning now to FIG. 8, this figure illustrates a flowchart of a series of acts 800 of selecting answer choices from potential answer choices for a digital question based on a response to another digital question. While FIG. 8 illustrates acts according to one embodiment, alternative embodiments may omit, add to, reorder, and/or modify any of the acts shown in FIG. 8.

As shown in FIG. 8, the series of acts 800 includes an act 810 of providing a first digital question to a client device. In particular, act 810 includes providing a first digital question to a client device associated with a user. Furthermore, in one or more embodiments, the act 810 also includes selecting one or more answer choices from a plurality of potential answer choices for the first digital question based on embedded user data.

As further shown in FIG. 8, the series of acts 800 includes an act 820 of receiving a first digital response corresponding to the first digital question. In particular, act 820 includes receiving, from the client device associated with the user, a first digital response corresponding to the first digital question. Moreover, in some embodiments, the act 820 also includes receiving, from the client device associated with the user, the first digital response as a text response. Additionally, the first digital response can also comprise a multiple choice selection.

As further shown in FIG. 8, the series of acts 800 includes an act 830 of accessing a second digital question associated with a plurality of potential answer choices. In particular, act 830 includes accessing, in response to receiving the first digital response, a second digital question associated with a plurality of potential answer choices to the second digital question. Additionally, the second digital question can also comprise operational logic to select one or more answer choices from the plurality of potential answer choices based on the first digital response.

As further shown in FIG. 8, the series of acts 800 includes an act 840 of selecting one or more answer choices for the second digital question. In particular, act 840 includes selecting one or more answer choices from the plurality of potential answer choices for the second digital question based on the first digital response. In one or more embodiments, act 840 also includes selecting the one or more answer choices from the plurality of potential answer choices for the second digital question based on embedded user data. Additionally, in some embodiments, the act 840 also includes selecting the one or more answer choices from the plurality of potential answer choices for the second digital question based on the first digital response by identifying the one or more answer choices from the plurality of potential answer choices that are associated with the first digital response. Moreover, in one or more embodiments, the act 840 also includes selecting the one or more answer choices from the plurality of potential answer choices for the second digital question based on a plurality of digital responses.

In some embodiments, the act 840 also includes selecting the one or more answer choices from the plurality of potential answer choices for the second digital question based on the first digital response as a text response. In particular, in one or more embodiments, the act 840 includes selecting the one or more answer choices from the plurality of potential answer choices for the second digital question based on the first digital response by identifying keywords from the first digital response and identifying the one or more answer choices from the plurality of potential answer choices that are associated with the keywords. Furthermore, in some embodiments, the act 840 includes selecting the one or more answer choices from the plurality of potential answer choices for the second digital question based on the first digital response by identifying a sentiment value from the first digital response and identifying the one or more answer choices from the plurality of potential answer choices that are associated with the sentiment value. In some embodiments, the act 840 includes selecting the one or more answer choices from the plurality of potential answer choices for the second digital question based on the first digital response by identifying keywords and sentiment values from the first digital response and identifying the one or more answer choices from the plurality of potential answer choices that are associated with the keywords or the sentiment values.

In one or more embodiments, the act 840 includes selecting the one or more answer choices from the plurality of potential answer choices for the second digital question based on the first digital response by utilizing a machine-learning model to generate a selection of the one or more answer choices from the plurality of potential answer choices. Additionally, the machine-learning model can be trained to generate the selection of the one or more answer choices from the plurality of potential answer choices. In some embodiments, the act 840 includes training the machine-learning model to generate the selection of the one or more answer choices from the plurality of potential answer by providing the machine-learning model with input training digital text responses to generate one or more answer choice predictions from the plurality of potential answer choices. Furthermore, in some embodiments, the act 840 includes training the machine-learning model to generate the selection of the one or more answer choices from the plurality of potential answer by comparing the one or more answer choice predictions to ground truth answer choice labels from the plurality of potential answer choices corresponding to the input training digital text responses.

As further shown in FIG. 8, the series of acts 800 includes an act 850 of providing the second digital question to a client device. In particular, the act 850 includes providing the second digital question and the one or more answer choices, selected from the plurality of potential answer choices, to the client device associated with the user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media. non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
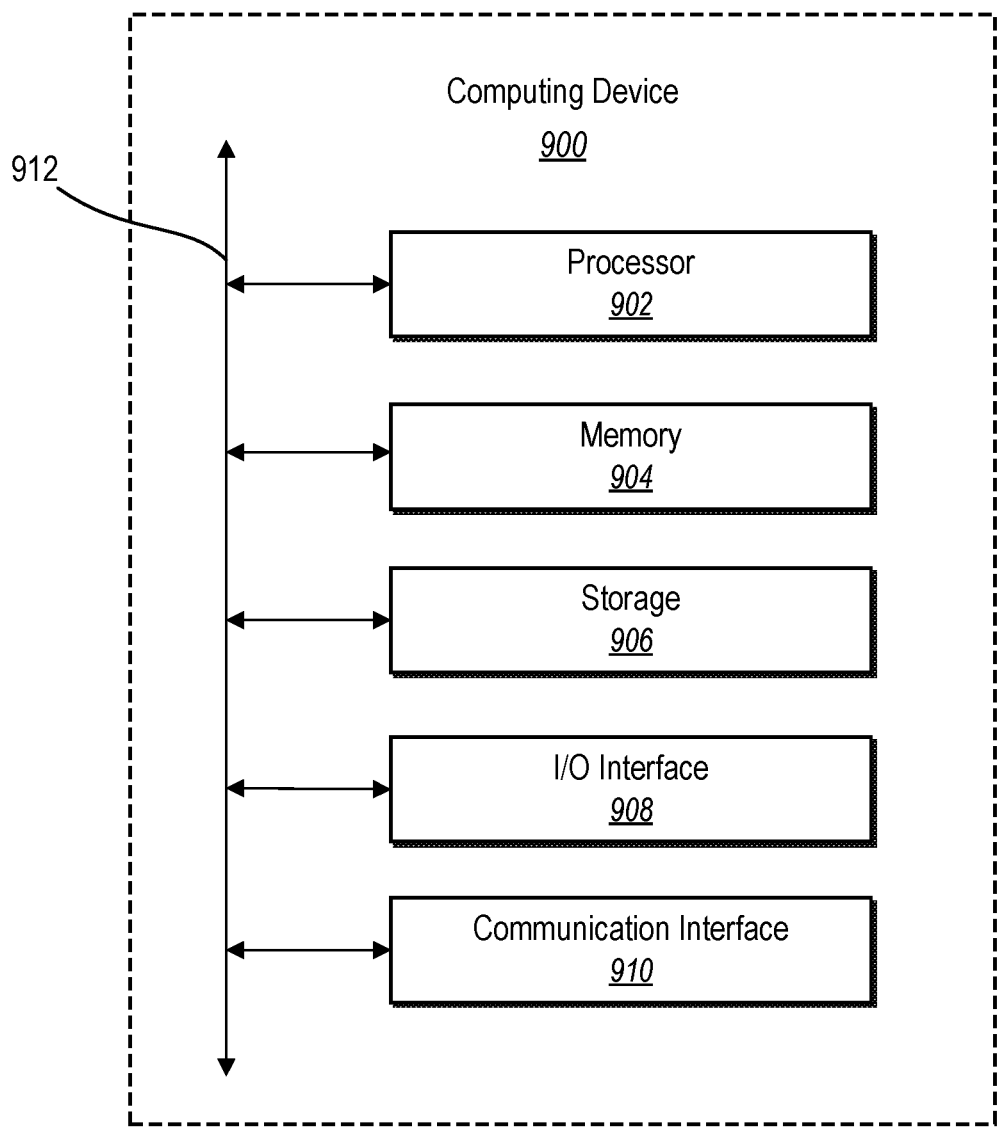
FIG. 9 illustrates a block diagram of a computing device in accordance with one or more embodiments.

FIG. 9 illustrates a block diagram of an exemplary computing device 900 that may be configured to perform one or more of the processes described above. One will appreciate that one or more computing devices such as the computing device 900 may implement the server device(s) 102 and/or other devices described above in connection with FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. While the exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example, and not by way of limitation, the processor 902 may include one or more instruction caches, one or more data caches, and one or more translation lookaside buffers ("TLBs"). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example, and not by way of limitation, storage device 906 can comprise a non-transitory storage medium described above. The storage device 906 may include a hard disk drive ("HDD"), a floppy disk drive, flash memory, an optical disc, a magneto-optical disc, magnetic tape, or a Universal Serial Bus ("USB") drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 910 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 910 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 10:
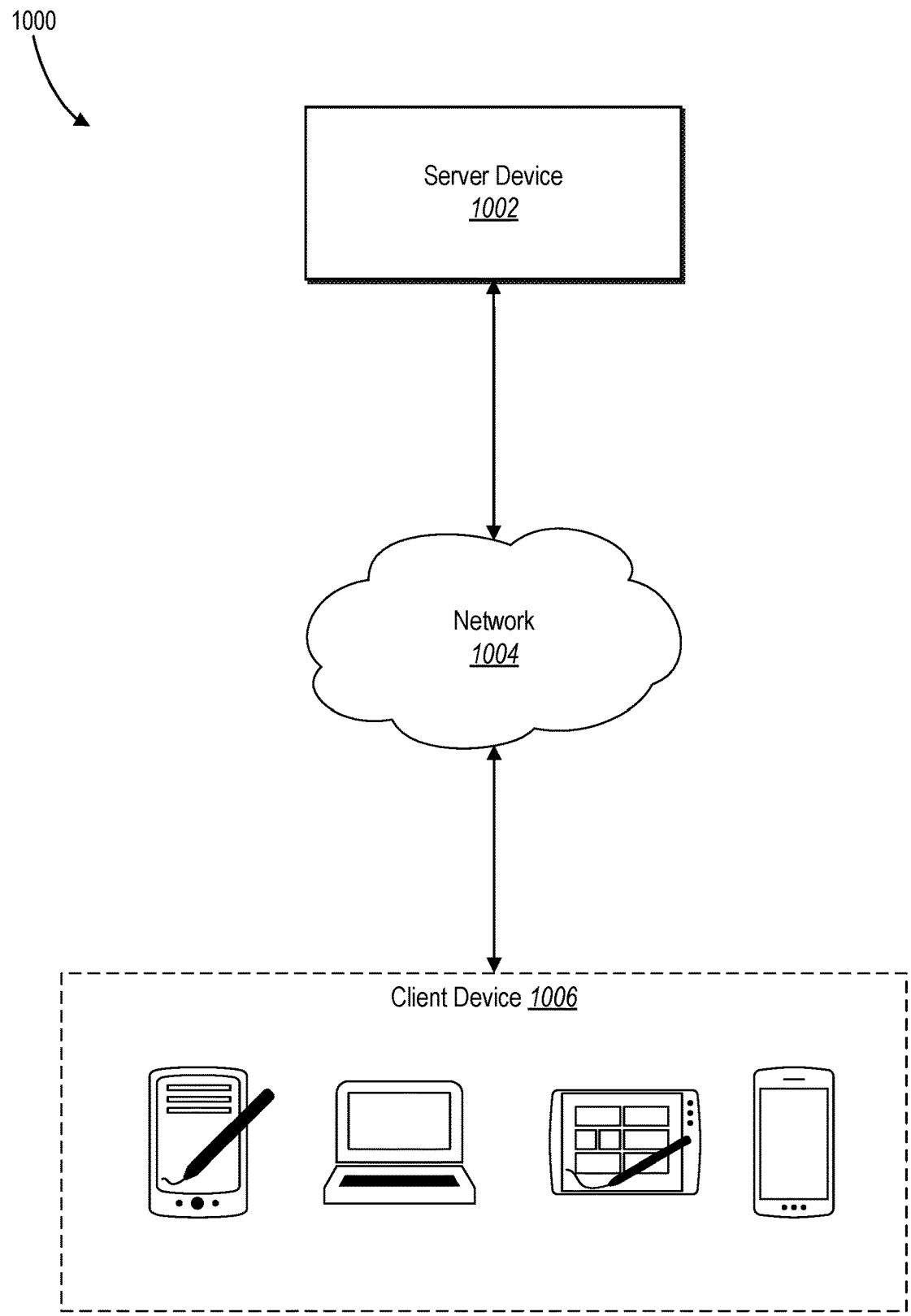
FIG. 10 illustrates a network environment of dynamic choice reference system in accordance with one or more embodiments.

FIG. 10 illustrates an example network environment 1000 of the environment 100. Network environment 1000 includes a client device 1006, and a server device 1002 connected to each other by a network 1004. Although FIG. 10 illustrates a particular arrangement of client device 1006, server device 1002, and network 1004, this disclosure contemplates any suitable arrangement of client device 1006, server device 1002, and network 1004. As an example, and not by way of limitation, two or more of client device 1006, and server device 1002 may be connected to each other directly, bypassing network 1004. As another example, two or more of client device 1006 and server device 1002 may be physically or logically co-located with each other in whole, or in part. Moreover, although FIG. 10 illustrates a particular number of client devices 1006, server devices 1002, and networks 1004, this disclosure contemplates any suitable number of client devices 1006, server devices 1002, and networks 1004. As an example, and not by way of limitation, network environment 1000 may include multiple client devices 1006, server devices 1002, and networks 1004.

This disclosure contemplates any suitable network 1004. As an example and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, and server device 1002 to communication network 1004 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 10. A client device 1006 may enable a network user at client device 1006 to access network 1004.

In particular embodiments, client device 1006 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1006 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1006 one or more Hyper Text Markup Language ("HTML") files responsive to the HTTP request. Client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1002 may include a variety of servers, sub-systems, programs, modules, logs, and data stores. In particular embodiments, server device 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 may also include suitable components such as network interfaces, security mechanisms, load balancers, failover servers, management-and-network-operations consoles, other suitable components, or any suitable combination thereof.

In particular embodiments, server device 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., survey respondents 116, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, by one or more processors, a first digital question to a graphical user interface of a client device associated with a user;
receiving, via the graphical user interface of the client device, a first digital response corresponding to the first digital question;
storing, within a data structure of the one or more processors, a dynamic choice reference dataset comprising digital mappings between the first digital response and a set of potential digital answer choices for a subsequent question;
in response to receiving the first digital response and by the one or more processors, dynamically generating a second digital question comprising a subset of digital answer choices from the set of potential digital answer choices by:
accessing the dynamic choice reference dataset within the data structure to identify the set of potential digital answer choices corresponding to a single instance of the second digital question;
training a neural network to generate a selection of the subset of digital answer choices from the set of potential digital answer choices by repetitively providing the neural network with input training digital text responses to generate one or more answer choice predictions from a training set of potential digital answer choices and comparing the one or more answer choice predictions to ground truth answer choice labels from the training set of potential digital answer choices corresponding to the input training digital text responses until the neural network can accurately select answer choice selections for the training set of potential digital answer choices; and
utilizing the neural network to generate, from within the dynamic choice reference dataset of the data structure, the selection of the subset of digital answer choices from the set of potential digital answer choices for the single instance of the second digital question by filtering the set of potential digital answer choices utilizing one or more digital mappings of the digital mappings; and
providing the generated second digital question with the subset of digital answer choices to the graphical user interface of the client device.

2. The computer-implemented method of claim 1, wherein selecting the subset of digital answer choices from the set of potential digital answer choices for the single instance of the second digital question is based on embedded user data associated with the first digital response corresponding to the first digital question.

3. The computer-implemented method of claim 1, wherein selecting the subset of digital answer choices from the set of potential digital answer choices for the single instance of the second digital question based on the first digital response comprises identifying that the subset of digital answer choices from the set of potential digital answer choices are associated with the first digital response utilizing tags corresponding to the subset of digital answer choices.

4. The computer-implemented method of claim 1, further comprising:
receiving, via the graphical user interface of the client device, the first digital response as a text response; and
wherein selecting the subset of digital answer choices from the set of potential digital answer choices for the single instance of the second digital question based on the first digital response comprises:
identifying keywords from the first digital response; and
identifying the subset of digital answer choices from the set of potential digital answer choices based on the keywords from the first digital response.

5. The computer-implemented method of claim 1, further comprising:
receiving, via the graphical user interface of the client device, the first digital response as a text response; and
wherein selecting the subset of digital answer choices from the set of potential digital answer choices for the single instance of the second digital question based on the first digital response comprises:
identifying a sentiment value from the first digital response; and
identifying the subset of digital answer choices from the set of potential digital answer choices that are associated with the sentiment value.

6. The computer-implemented method of claim 1, wherein training the neural network to generate the selection of the subset of digital answer choices from the set of potential digital answer choices further comprises:
generating a calculated loss by comparing the one or more answer choice predictions to the ground truth answer choice labels; and
utilizing the calculated loss to adjust parameters in the neural network.

7. The computer-implemented method of claim 1, wherein the first digital response comprises a multiple choice selection or a text response.

8. The computer-implemented method of claim 1, wherein the second digital question comprises operational logic to select the subset of digital answer choices from the set of potential digital answer choices based on the first digital response.

9. The computer-implemented method of claim 1, wherein the second digital question remains across multiple digital surveys.

10. A system comprising:
at least one processor; and
a non-transitory computer readable storage medium comprising instructions that, when executed by the at least one processor, cause the system to:
provide a first digital question to a graphical user interface of a client device associated with a user;
receive, via the graphical user interface of the client device, a first digital response corresponding to the first digital question;
store, within a data structure, a dynamic choice reference dataset comprising digital mappings between the first digital response and a set of potential digital answer choices for a subsequent question;
in response to receiving the first digital response, dynamically generate a second digital question comprising a subset of digital answer choices from the set of potential digital answer choices by:
accessing the dynamic choice reference dataset within the data structure to identify the set of potential digital answer choices corresponding to a single instance of the second digital question;
training a neural network to generate a selection of the subset of digital answer choices from the set of potential digital answer choices by repetitively providing the neural network with input training digital text responses to generate one or more answer choice predictions from a training set of potential digital answer choices and comparing the one or more answer choice predictions to ground truth answer choice labels from the training set of potential digital answer choices corresponding to the input training digital text responses until the neural network can accurately select answer choice selections for the training set of potential digital answer choices; and
utilizing the neural network to generate, from within the dynamic choice reference dataset of the data structure, the selection of the subset of digital answer choices from the set of potential digital answer choices for the single instance of the second digital question by filtering the set of potential digital answer choices utilizing one or more digital mappings of the digital mappings; and
provide the generated second digital question with the subset of digital answer choices to the graphical user interface of the client device.

11. The system of claim 10, wherein selecting the subset of digital answer choices from the set of potential digital answer choices for the single instance of the second digital question based on the first digital response comprises identifying the subset of digital answer choices from the set of potential digital answer choices that are mapped to the first digital response within the dynamic choice reference dataset.

12. The system of claim 10, further comprising instructions that, when executed by the at least one processor, cause the system to:
receive, from the client device associated with the user, the first digital response as a text response; and
wherein selecting the subset of digital answer choices from the set of potential digital answer choices for the single instance of the second digital question based on the first digital response comprises:
identifying keywords from the first digital response; and
identifying the subset of digital answer choices from the set of potential digital answer choices that are associated with the keywords.

13. The system of claim 10, further comprising instructions that, when executed by the at least one processor, cause the system to:
receive, via the graphical user interface of the client device, the first digital response as a text response; and
wherein selecting the subset of digital answer choices from the set of potential digital answer choices for the single instance of the second digital question based on the first digital response comprises:
identifying a sentiment value from the first digital response; and
identifying the subset of digital answer choices from the set of potential digital answer choices that are associated with the sentiment value.

14. The system of claim 10, wherein training the neural network to generate the selection of the subset of digital answer choices from the set of potential digital answer choices further comprises:
- generating a calculated loss by comparing the one or more answer choice predictions to the ground truth answer choice labels; and
- utilizing the calculated loss to adjust parameters in the neural network.

15. A non-transitory computer readable medium storing instructions thereon that, when executed by at least one processor, cause a computer device to:
- provide a first digital question to a graphical user interface of a client device associated with a user;
- receive, via the graphical user interface of the client device, a first digital response corresponding to the first digital question;
- store, within a data structure of the at least one processor, a dynamic choice reference dataset comprising digital mappings between the first digital response and a set of potential digital answer choices for a subsequent question;
- in response to receiving the first digital response and by the at least one processor, dynamically generate a second digital question comprising a subset of digital answer choices from the set of potential digital answer choices by:
  - accessing the dynamic choice reference dataset within the data structure to identify the set of potential digital answer choices corresponding to a single instance of the second digital question;
  - training a neural network to generate a selection of the subset of digital answer choices from the set of potential digital answer choices by repetitively providing the neural network with input training digital text responses to generate one or more answer choice predictions from a training set of potential digital answer choices and comparing the one or more answer choice predictions to ground truth answer choice labels from the training set of potential digital answer choices corresponding to the input training digital text responses until the neural network can accurately select answer choice selections for the training set of potential digital answer choices; and
  - utilizing the neural network to generate, from within the dynamic choice reference dataset of the data structure, the selection of the subset of digital answer choices from the set of potential digital answer choices for the single instance of the second digital question by filtering the set of potential digital answer choices utilizing one or more digital mappings of the digital mappings; and
- provide the generated second digital question with the subset of digital answer choices to the graphical user interface of the client device.

16. The non-transitory computer readable medium of claim 15, wherein the one or more digital mappings indicate the subset of digital answer choices reference the first digital response within the dynamic choice reference dataset.

17. The non-transitory computer readable medium of claim 15, further comprising instructions that, when executed by the at least one processor, cause the computer device to:
- receive, via the graphical user interface of the client device, the first digital response as a text response; and
- wherein selecting the subset of digital answer choices from the set of potential digital answer choices for the single instance of the second digital question based on the first digital response comprises:
  - identifying keywords and sentiment values from the first digital response; and
  - identifying the subset of digital answer choices from the set of potential digital answer choices that are associated with the keywords or the sentiment values.

18. The non-transitory computer readable medium of claim 15, wherein training the neural network to generate the selection of the subset of digital answer choices from the set of potential digital answer choices further comprises:
- generating a calculated loss by comparing the one or more answer choice predictions to the ground truth answer choice labels; and
- utilizing the calculated loss to adjust parameters in the neural network.

* * * * *